United States Patent
Ikezaki et al.

(10) Patent No.: US 10,178,523 B2
(45) Date of Patent: *Jan. 8, 2019

(54) POSITION DETECTION SYSTEM AND POSITION DETECTION METHOD

(71) Applicant: Panasonic Intellectual Property Management Co., Ltd., Osaka (JP)

(72) Inventors: Issei Ikezaki, Kanagawa (JP); Takatsugu Ito, Kanagawa (JP); Taisuke Konishi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/573,106

(22) PCT Filed: Mar. 23, 2016

(86) PCT No.: PCT/JP2016/001682
§ 371 (c)(1),
(2) Date: Nov. 9, 2017

(87) PCT Pub. No.: WO2016/189783
PCT Pub. Date: Dec. 1, 2016

(65) Prior Publication Data
US 2018/0124586 A1    May 3, 2018

(30) Foreign Application Priority Data
May 28, 2015   (JP) ................................ 2015-108928

(51) Int. Cl.
*G01S 1/68*        (2006.01)
*H04W 4/30*        (2018.01)
(Continued)

(52) U.S. Cl.
CPC .................. *H04W 4/30* (2018.02); *G01S 1/68* (2013.01); *G01S 5/02* (2013.01); *G01S 5/0205* (2013.01);
(Continued)

(58) Field of Classification Search
CPC ................................................ H04W 52/0245
(Continued)

(56) References Cited

U.S. PATENT DOCUMENTS 7,327,312 B1 *  2/2008  Harris ..................... G01C 21/20
                                                    342/357.51
7,551,128 B2 *  6/2009  Harris ..................... G01C 21/20
                                                    342/357.51
(Continued)

FOREIGN PATENT DOCUMENTS

| JP | 2001-169333 A | 6/2001 |
| JP | 2002-077974 A | 3/2002 |
| JP | 2010-074779 A | 4/2010 |

OTHER PUBLICATIONS

International Search Report, dated Jun. 21, 2016, for corresponding International Application No. PCT/JP2016/001682, 3 pages.

*Primary Examiner* — William D Cumming
(74) *Attorney, Agent, or Firm* — Seed IP Law Group LLP

(57) ABSTRACT

A position detection system is provided which is capable of inhibiting an increase in system costs and improving accuracy of detecting a position of a terminal. In the position detection system, a first terminal measures radio waves from a wireless connection device or a second terminal, and transmits a measurement result to a position detection server through the wireless connection device. The position detection server estimates that the first terminal is located in a position of the second terminal which has transmitted the radio waves in a case where the measurement result includes information of the radio waves from the second terminal, (Continued)

and estimates the position of the first terminal based on information of radio wave intensity of the radio waves from the wireless connection device, which is included in the measurement result, reference data, and positional information of the second terminal in a case where the measurement result does not include the information of the radio waves from the second terminal.

7 Claims, 15 Drawing Sheets

(51) Int. Cl.
*G01S 5/02* (2010.01)
*H04W 4/02* (2018.01)
*H04W 64/00* (2009.01)

(52) U.S. Cl.
CPC ............ *H04W 4/02* (2013.01); *H04W 4/025* (2013.01); *H04W 64/00* (2013.01); *H04W 64/006* (2013.01)

(58) Field of Classification Search
USPC .......................................... 455/456.1, 456.3
See application file for complete search history.

(56) References Cited

U.S. PATENT DOCUMENTS

| | | | | |
|---|---|---|---|---|
| 7,817,085 | B2 * | 10/2010 | Harris | G01C 21/20 342/357.21 |
| 8,717,231 | B1 * | 5/2014 | Harris | G01C 21/20 342/357.21 |
| 8,805,409 | B2 * | 8/2014 | Akiyama | H04W 52/0245 455/456.1 |
| 8,805,416 | B2 * | 8/2014 | Harris | G01C 21/20 455/456.3 |
| 9,625,269 | B2 * | 4/2017 | Harris | G01C 21/20 |
| 2004/0198387 | A1 * | 10/2004 | Tsuji | G01S 5/0036 455/456.1 |
| 2009/0213009 | A1 * | 8/2009 | Ishiwatari | G01S 5/021 342/450 |
| 2018/0124586 | A1 * | 5/2018 | Ikezaki | G01S 1/68 |
| 2018/0143286 | A1 * | 5/2018 | Ikezaki | G01S 1/68 |

* cited by examiner

FIG. 13

| LIST NUMBER | xCOORDINATE | yCOORDINATE | CS-ID | RADIO WAVE INTENSITY | CS-ID | RADIO WAVE INTENSITY | ... | CS-ID | RADIO WAVE INTENSITY |
|---|---|---|---|---|---|---|---|---|---|
| BEACON BT1 | 150 | 180 | CS-A | -62 | CS-B | -76 | | CS-D | -80 |
| BEACON BT2 | 600 | 300 | CS-A | -68 | CS-B | -80 | | CS-D | -66 |
| CS-A | 230 | 800 | CS-B | -60 | CS-C | -62 | | CS-D | -70 |

| TERMINAL ID | CS-ID | RADIO WAVE INTENSITY | CS-ID | RADIO WAVE INTENSITY | ... | CS-ID | RADIO WAVE INTENSITY |
|---|---|---|---|---|---|---|---|
| Term-A | CS-A | -60 | CS-B | -72 | | CS-D | -78 |

125

POSITION DETECTION SYSTEM AND POSITION DETECTION METHOD

TECHNICAL FIELD

The present disclosure relates to a position detection system and a position detection method which detects a position of a terminal.

BACKGROUND ART

In the related art, a position of wireless telephone is detected by a wireless telephone system (refer to PTLs 1, 2, and 3). In the wireless telephone system, the position of the wireless telephone is detected in such a way that a plurality of wireless connection devices, which are wirelessly connectable to the wireless telephone, are installed and that each of the wireless connection devices receives radio wave signals from the wireless telephone.

In PTL 1, a position display device extracts positional information of a wireless base station, through which a response signal from a wireless telephone passes, from an exchanger to display the positional information of the wireless telephone. In PTL 2, a management terminal acquires positional information transmitted from a wireless slave device through a wireless base station to display the positional information. In PTL 3, a wireless mobile terminal device performs position registration and call processing such as call originating/call terminating.

CITATION LIST

Patent Literature

PTL 1: Japanese Patent Unexamined Publication No. 2001-169333

PTL 2: Japanese Patent Unexamined Publication No. 2002-77974

PTL 3: Japanese Patent Unexamined Publication No. 2010-74779

SUMMARY OF THE INVENTION

In the technologies disclosed in PTLs 1 to 3, the number of wireless connection devices of the wireless telephone system is not sufficient for position detection, and accuracy of detecting a position of the wireless telephone is low. In a case where the number of wireless connection devices each having a telephone function is increased to improve the accuracy of detecting the position, system costs are increased.

The present disclosure is made in view of the above circumstances, and provides a position detection system and a position detection method in which it is possible to inhibit an increase in system costs and improve accuracy of detecting a position of a terminal.

A position detection system according to the present disclosure includes a first terminal, a plurality of second terminals, a wireless connection device, and a position detection server. Each of the second terminals is disposed in a prescribed position and transmits radio waves in first radio wave intensity which is a weak output. The wireless connection device is disposed in a prescribed position, and transmits radio waves in second radio wave intensity which is higher than the first radio wave intensity. The first terminal measures the radio waves from the wireless connection device or each of the second terminals, and transmits a measurement result to the position detection server through the wireless connection device. The position detection server estimates a position of the first terminal from the measurement result received from the first terminal. In a case where the measurement result includes information of the radio waves from each of the second terminals, the position detection server estimates that the first terminal is located in a position of each of the second terminal which has transmitted the radio waves. In a case where the measurement result does not include the information of the radio waves from each of the second terminals, the position detection server estimates the position of the first terminal based on the information of the radio wave intensity of the radio waves from the wireless connection device, which is included in the measurement result, first reference data which is maintained in the memory, and a plurality of pieces of positional information of the plurality of second terminals.

According to the present disclosure, it is possible to inhibit an increase in system costs and improve accuracy of detecting a position of the terminal.

BRIEF DESCRIPTION OF DRAWINGS

FIG. 13 is a diagram illustrating an example of registration content of a reference data table.

FIG. 14 is a schematic diagram illustrating an example of registration content of a measurement data table.

DESCRIPTION OF EMBODIMENTS

Hereinafter, embodiments will be described in detail while appropriately referring to the accompanying drawings.

There is a case where unnecessarily detailed description is omitted. For example, there is a case where detailed description of an item, which is already well known, and duplicated description with respect to substantially the same configuration are omitted. The reason for this is to avoid description, below, being unnecessarily redundant for easy understanding of those skilled in the art. Also, the accompanying drawings and description below are provided to make those skilled in the art sufficiently understand the present disclosure, and do not intend to limit subjects disclosed in claims.

A position detection system according to embodiments below are applied to, for example, a Private Branch eXchange (PBX) system having a function of detecting a position of a terminal.

First Embodiment

[Configuration]

Figure 1:
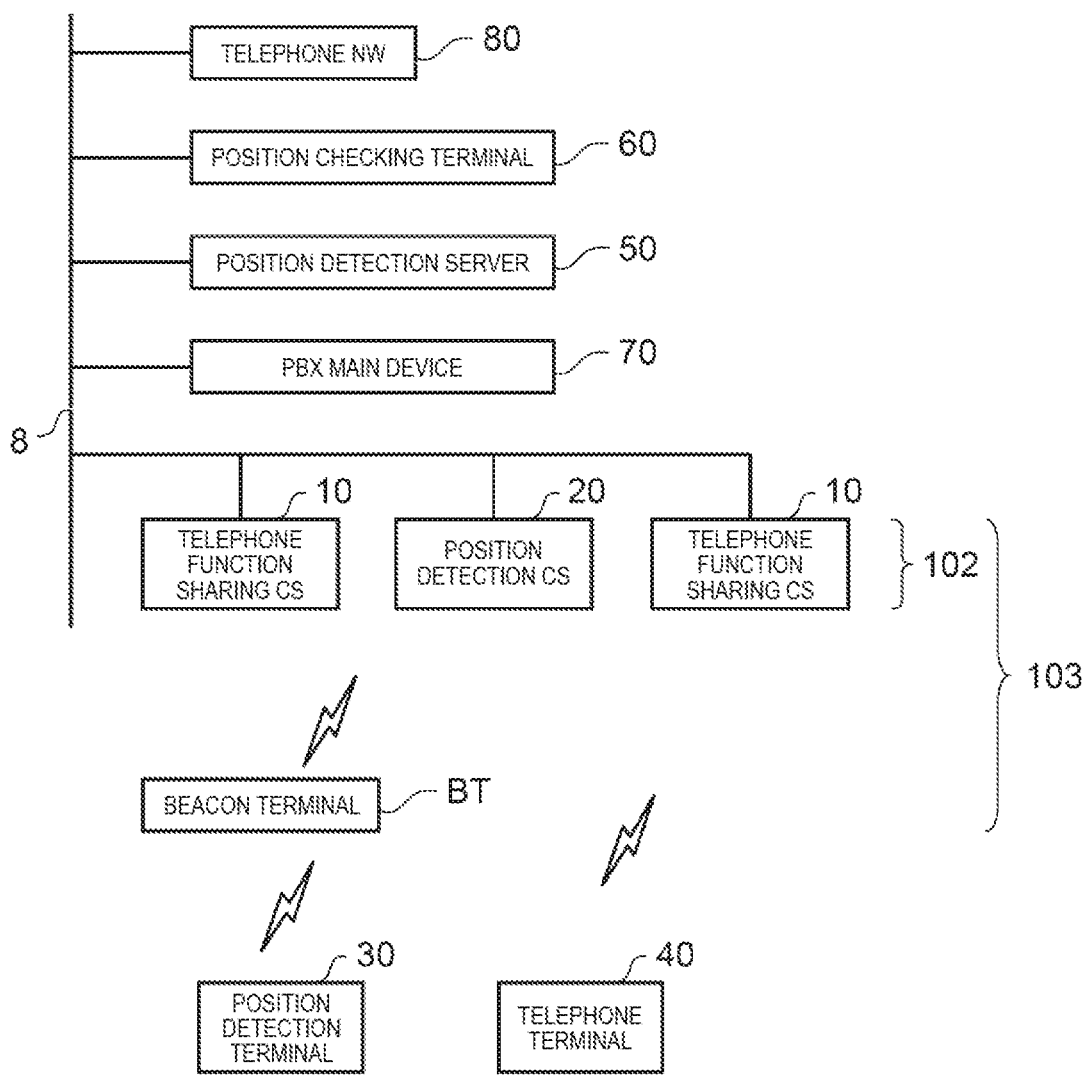
FIG. 1 is a block diagram illustrating an example of a schematic configuration of a Private Branch eXchange (PBX) system according to a first embodiment.

FIG. 1 is a block diagram illustrating a schematic configuration of PBX system 5 according to an embodiment. PBX system 5 includes telephone function sharing CS 10, position detection CS 20 position detection server 50, position checking terminal 60, and PBX main device 70. Telephone function sharing CS 10, position detection CS 20, position detection server 50, position checking terminal 60, and PBX main device 70 are connected to IP network 8. PBX system 5 includes a plurality of beacon terminals BT, and has a function (position detection function) of detecting a position of a terminal (for example, position detection terminal 30 or telephone terminal 40) using beacon terminals BT.

Beacon terminals BT are installed in, for example, a plurality of predetermined positions (prescribed positions) of room 180 (see FIG. 8), respectively, and regularly transmit weak omnidirectional radio waves (beacon signals). Each of beacon terminals BT forms a reception area (small cell) in which it is possible for the terminal to perform reception. That is, the beacon signals reach a prescribed area from each of beacon terminals BT. The area corresponds to the reception area. Also, a size of the small cell depends on a maximum transmission distance of the beacon signals which are transmitted by each of beacon terminals BT.

Telephone function sharing CS 10 is a telephone function sharing wireless connection device (Cell Station (CS)) which communicates data for detecting the position of the terminal and has a telephone function. Position detection CS 20 is a position detection-dedicated wireless connection device which communicates the data for detecting the position of the terminal but does not have the telephone function. Accordingly, telephone function sharing CS 10 and position detection CS 20 are wirelessly connected to both position detection terminal 30 and telephone terminal 40, and communicate the data for detecting the position of the terminal. Also, a ratio of the number of installations of telephone function sharing CS 10 to position detection CS 20 which will be installed depends on, for example, a balance between required accuracy of detecting a position and system costs.

Telephone network (NW) 80 is connected to IP network 8. Telephone terminal 40 is capable of performing a voice call with a fixed telephone (not illustrated in the drawing) which is connected to telephone NW 80 through telephone function sharing CS 10 and PBX main device 70.

Figure 2:
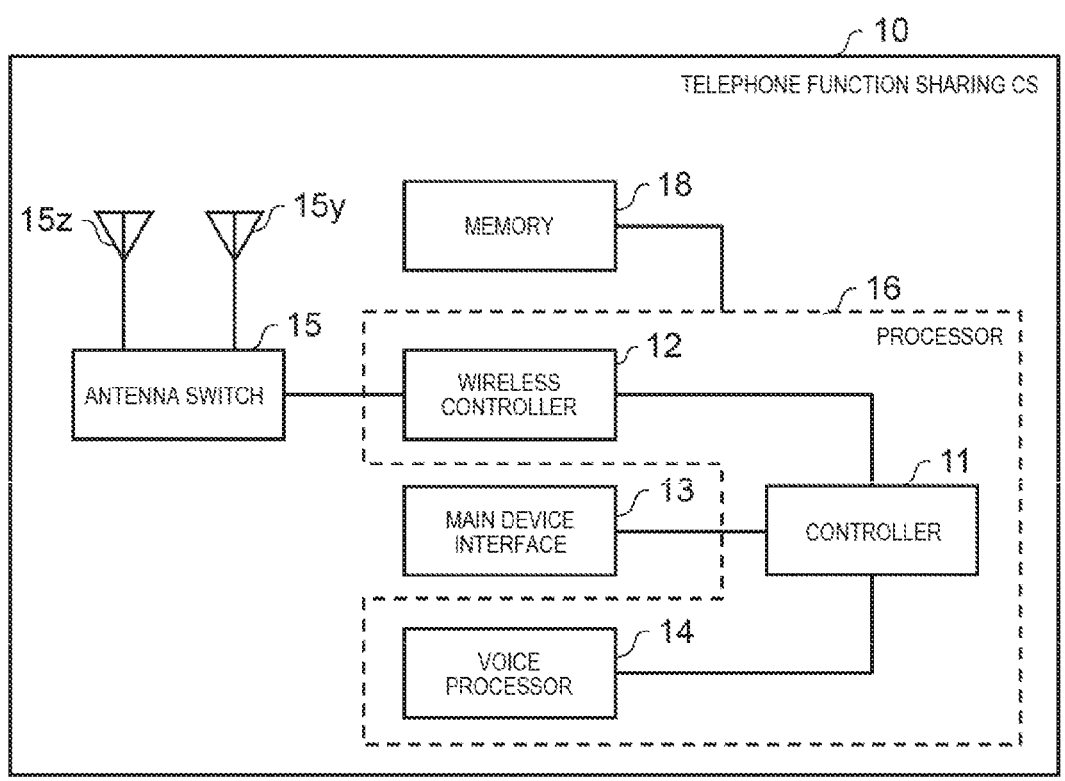
FIG. 2 is a block diagram illustrating an example of a configuration of a telephone function sharing Cell Station (CS).

FIG. 2 is a block diagram illustrating a configuration of telephone function sharing CS 10. At least one telephone function sharing CS 10 is installed and regularly sends out radio waves (beacon signals) in order to notify own existence. The beacon signals are received by, for example, position detection terminal 30, telephone terminal 40, and beacon terminals BT.

Telephone function sharing CS 10 includes processor 16, main device interface 13, antenna switch 15, and memory 18. A plurality of antennas 15z and 15y are connected to antenna switch 15.

Processor 16 includes, for example, a Central Processing Unit (CPU) or a Digital Signal Processor (DSP). Processor 16 performs various processes and various controls in cooperation with memory 18. Specifically, processor 16 realizes functions of controller 11, wireless controller 12, and voice processor 14 by executing a program which is maintained in memory 18.

Memory 18 maintains, for example, various data, pieces of information, programs, tables, and databases. Memory 18 may be embedded in processor 16. Memory 18 includes a primary storage device, and may include a secondary storage device. The primary storage device includes, for example, Read Only Memory (ROM) or Random Access Memory (RAM). The secondary storage device includes, for example, a Hard Disk Drive (HDD) or a Solid State Drive (SSD).

Controller 11 integrally controls operations of respective units of telephone function sharing CS 10.

Wireless controller 12 is wirelessly connected to beacon terminals BT, position detection terminal 30 and telephone terminal 40, and performs wireless communication. A communication method realized by wireless controller 12 includes, for example, Digital Enhanced Cordless Telecommunications (DECT) which enables connection with a plurality of terminals through Time Division Multiple Access (TDMA). Also, the communication method is not limited to DECT. 2.4 GHz-band digital cordless, Personal Handyphone System (PHS), and the like may be used.

Main device interface 13 controls connection of IP network 8 to communicate data with PBX main device 70 through IP network 8.

Voice processor 14 encodes and decodes voice data communicated between voice processor 14 and telephone terminal 40 to realize the telephone function.

Antenna switch 15 switches between a plurality of (for example, two) antennas 15z and 15y according to an instruction from wireless controller 12. Two antennas 15z and 15y are attached, for example, in different directivity directions, respectively. Antenna switch 15 performs switching to use an antenna in which a reception signal level is higher between, for example, two antennas 15z and 15y.

Figure 3:
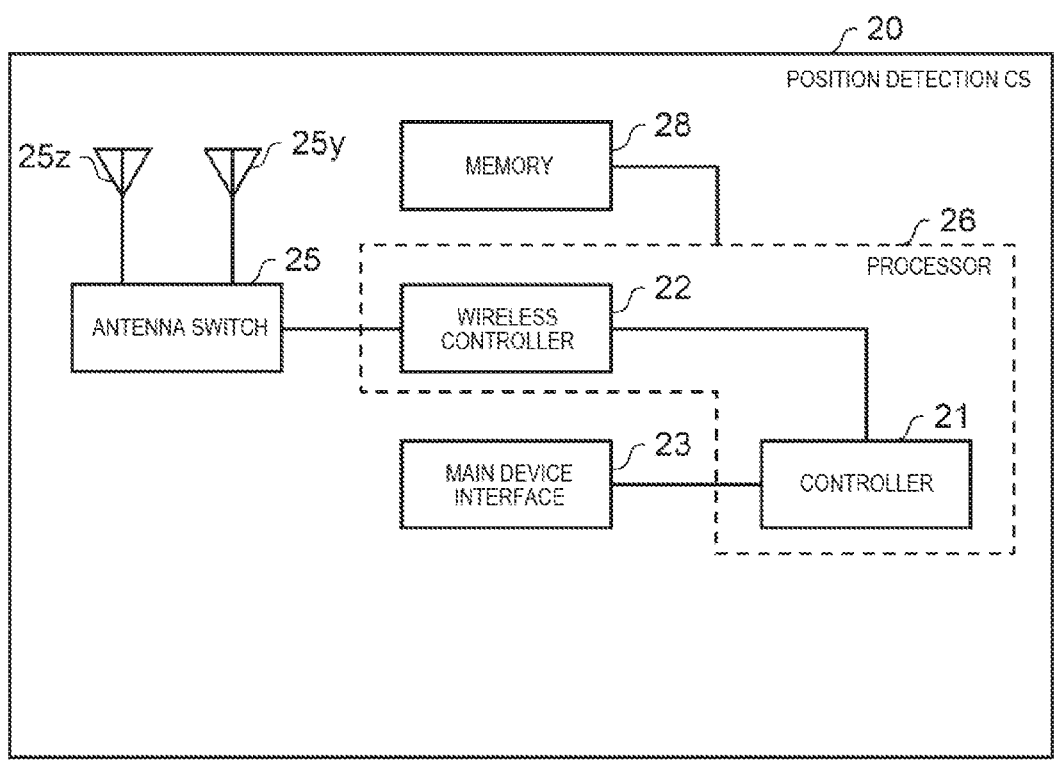
FIG. 3 is a block diagram illustrating an example of a configuration of a position detection CS.

FIG. 3 is a block diagram illustrating a configuration of position detection CS 20. Position detection CS 20 regularly sends out a beacon signal with respect to the terminal in order to notify its own existence. Here, the terminal includes, for example, beacon terminals BT in addition to position detection terminal 30 and telephone terminal 40. Also, one or more position detections CS 20 may be installed or position detection CS 20 may not be installed.

Position detection CS 20 includes processor 26, main device interface 23, antenna switch 25, and memory 28. A plurality of antennas 25z and 25y are connected to antenna switch 25.

Processor 26 includes, for example, a CPU or a DSP. Processor 26 performs various processes and various controls in cooperation with memory 28. Specifically, processor 26 realizes functions of controller 21 and wireless controller 22 by executing a program maintained in memory 28.

Memory 28 maintains, for example, various data pieces of information, programs, tables, and database. Memory 28 may be embedded in processor 26. Memory 28 includes a primary storage device, and may include a secondary storage device.

Controller 21 integrally controls operations of respective units of position detection CS 20.

Wireless controller 22 transmits the beacon signals which are received from beacon terminals BT, position detection terminal 30, or telephone terminal 40. The beacon signals are synchronized with beacon signals, which are transmitted by telephone function sharing CS 10, by time. Similar to telephone function sharing CS 10, DECT, 2.4 GHz-band digital cordless, PHS, and the like are used as the communication method.

Main device interface 23 controls connection of IP network 8 to communicate data with PBX main device 70 through IP network 8.

Antenna switch 25 switches between a plurality of (for example, two) antennas 25z and 25y according to an instruction from wireless controller 22. Two antennas 25z and 25y are attached, for example, in different directivity directions respectively. Antenna switch 25 performs switching to use an antenna in which a reception signal level is higher between, for example, two antennas 25z and 25y.

As described above, since position detection CS 20 does not include a voice processor for realizing the telephone function, position detection CS 20 has a simple configuration and is inexpensive compared to telephone function sharing CS 10. Also in a case where it is not necessary to particularly distinguish between telephone function sharing CS 10 and position detection CS 20, hereinafter, telephone function sharing CS 10 and position detection CS 20 are named as a "wireless connection device" and are expressed as wireless connection device 102. In addition, in a case where wireless connection device 102, which generically names telephone function sharing CS 10 and position detection CS 20, is not distinguished from beacon terminals BT, wireless connection device 102 and beacon terminals BT are simply named as a "wireless device" and are expressed as wireless device 103.

Accordingly, wireless connection device 102 includes at least one of telephone function sharing CS 10 and position detection CS 20. Wireless device 103 includes at least one of telephone function sharing CS 10, position detection CS 20, and beacon terminals BT.

Figure 4:
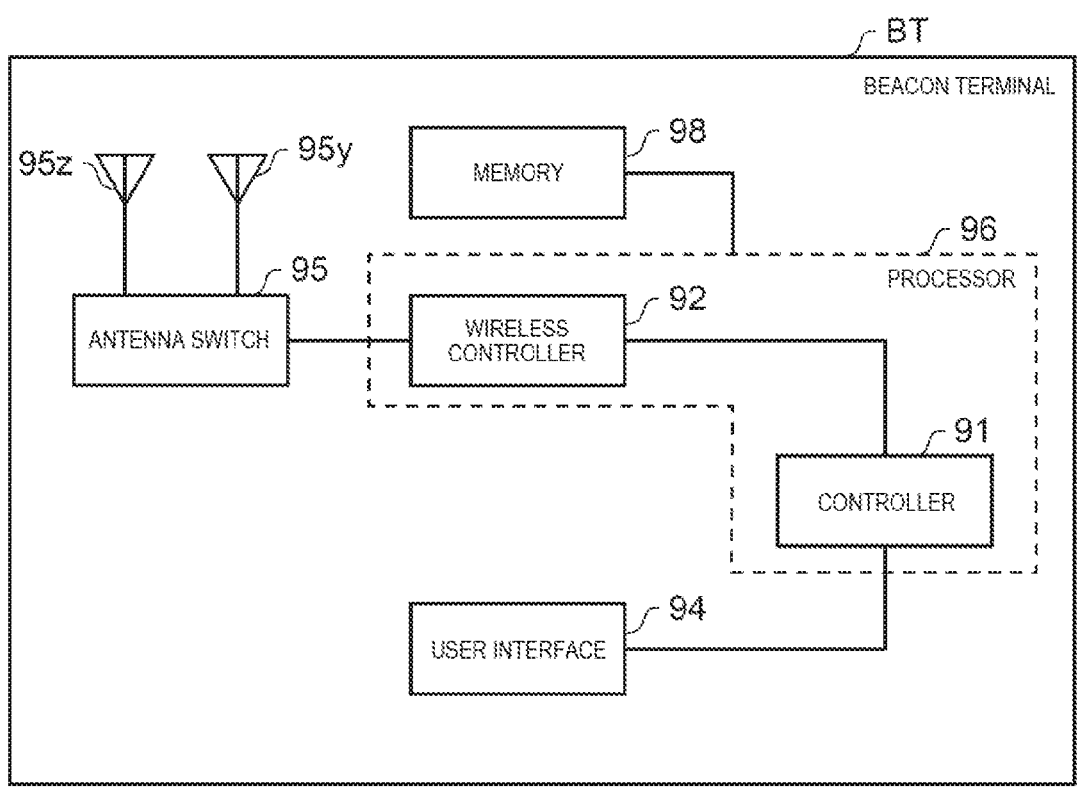
FIG. 4 is a block diagram illustrating an example of a configuration of a beacon terminal.

FIG. 4 is a block diagram illustrating a configuration of each of beacon terminals BT. Each of beacon terminals BT transmits omnidirectional beacon signals. A reception area, in which it is possible to receive the beacon signals, is a small cell.

Each of beacon terminals BT includes processor 96, memory 98, user interface 94, and antenna switch 95. A plurality of antennas 95y and 95z are connected to antenna switch 95. In addition, a battery (not illustrated in the drawing) may be embedded in each of beacon terminals BT as a power supply which supplies electric power to respective units, or each of beacon terminals may be connected to a commercial AC power source.

Processor 96 includes, for example, a CPU or a DSP. Processor 96 performs various processes and various controls in cooperation with memory 98. Specifically, processor 96 realizes functions of controller 91 and wireless controller 92 by executing a program maintained in memory 98.

Memory 98 maintains, for example, various data, pieces of information, programs, tables, and database. Memory 98 may be embedded in processor 96. Memory 98 includes a primary storage device, and may include a secondary storage device.

Controller 91 integrally controls operations of respective units of each of beacon terminals BT.

Wireless controller 92 is wirelessly connected to position detection terminal 30 or wireless connection device 102, and performs wireless communication. Wireless controller 92 receives the beacon signals from wireless connection device 102, and transmits beacon signals received from position detection terminal 30 or telephone terminal 40.

In addition, wireless controller 92 performs control such that the signals, which are communicated between wireless controller 92 and wireless connection device 102, are synchronized using the same communication method as in wireless connection device 102. Therefore, each of beacon terminals BT is capable of detecting the beacon signals, which are transmitted by wireless connection device 102, in a short time, and is capable of transmitting reference data, which is a search result, to wireless connection device 102 in a short time.

User interface 94 includes a display (not illustrated in the drawing), operation buttons (not illustrated in the drawing), and the like.

Antenna switch 95 switches between a plurality of (for example, two) antennas 95z and 95y according to an instruction from wireless controller 92. Antenna switch 95 performs switching to use an antenna in which a reception signal level is higher between, for example, two antennas 95z and 95y. Here, although both of the two antennas 95z and 95y are omnidirectional antennas, antennas 95z and 95y may be antennas which have directivities in different directions, respectively.

Figure 5:
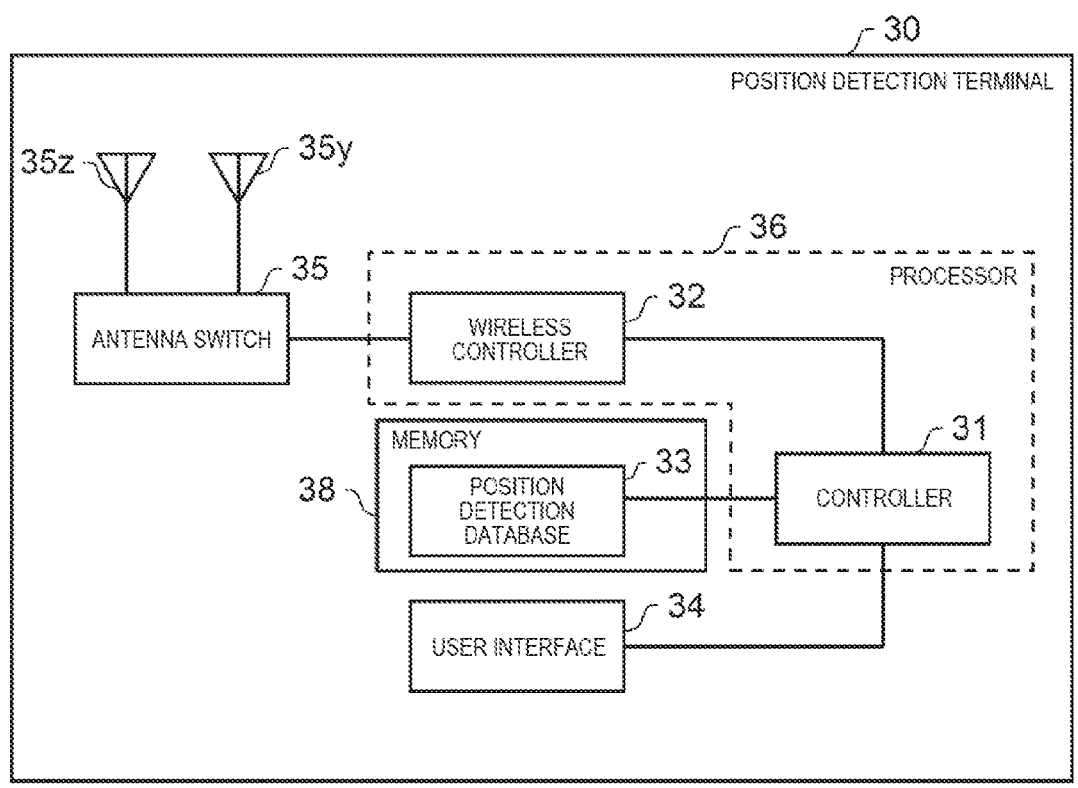
FIG. 5 is a block diagram illustrating an example of a configuration of a position detection terminal.

FIG. 5 is a block diagram illustrating a configuration of position detection terminal 30. Position detection terminal 30 is a terminal whose position is detected. Position detection terminal 30 is mounted on, for example, various devices and mobile terminals, or mounted on a user. In the embodiment, an example is illustrated in which the user possesses position detection terminal 30 in a state in which the user hangs position detection terminal 30 around his or her neck (see FIG. 8). Here, an example is illustrated in which position detection terminal 30 is, for example, a mobile terminal or a tag and is moved with movement of the user. Also, it may be assumed that position detection terminal 30 is attached to an article whose position is fixed and is disposed in a prescribed position.

Position detection terminal 30 includes processor 36, memory 38, user interface 34, and antenna switch 35. A plurality of antennas 35y and 35z are connected to antenna switch 35. Also, position detection terminal 30 is embedded with a battery (not illustrated in the drawing) as a power source which supplies electric power to respective units.

Processor 36 includes, for example, a CPU or a DSP. Processor 36 performs various processes and various controls in cooperation with memory 38. Specifically, processor 36 realizes functions of controller 31 and wireless controller 32 by executing a program maintained in memory 38.

Memory 38 maintains, for example, various data, pieces of information, programs, tables, and database. Memory 38 may be embedded in processor 36. Memory 38 includes a primary storage device, and may include a secondary storage device. Memory 38 stores position detection database 33.

Controller 31 integrally controls operations of respective units of position detection terminal 30.

Wireless controller 32 is wirelessly connected to beacon terminals BT or wireless connection device 102, and performs wireless communication. Wireless controller 32 receives the beacon signals from wireless device 103.

Position detection database 33 stores a search table and a CS ranking table (not illustrated in the drawing). The search table and the CS ranking table are acquired from data of a result (search result) acquired by searching wireless device 103. In the search, radio waves are detected and radio wave intensity is measured.

The search table includes, for example, pieces of information such as search elapse time from start of search of beacon terminals BT and wireless connection device 102, pieces of identification information of detected beacon terminals BT and wireless connection device 102, and measured radio wave intensity of radio waves from each of beacon terminals BT and wireless connection device 102.

The CS ranking table includes, for example, pieces of information such as ranking of electric field intensities, the pieces of identification information of detected beacon terminals BT and wireless connection device 102, and measured radio wave intensity of the radio waves from each of beacon terminals BT and wireless connection device 102.

User interface 34 includes a display (for example, Light Emitting Diode (LED)), operation buttons (not illustrated in the drawing), and the like. For example, in a case where position detection terminal 30 is missing, the display lights up according to an instruction of wireless connection device 102.

Antenna switch 35 switches between the plurality of (for example, two) antennas 35$z$ and 35$y$ according to an instruction of wireless controller 32. Two antennas 35$z$ and 35$y$ are attached, for example, in different directivity directions, respectively. Antenna switch 35 performs switching to use an antenna in which a reception signal level is higher between, for example, two antennas 35$z$ and 35$y$.

Figure 6:
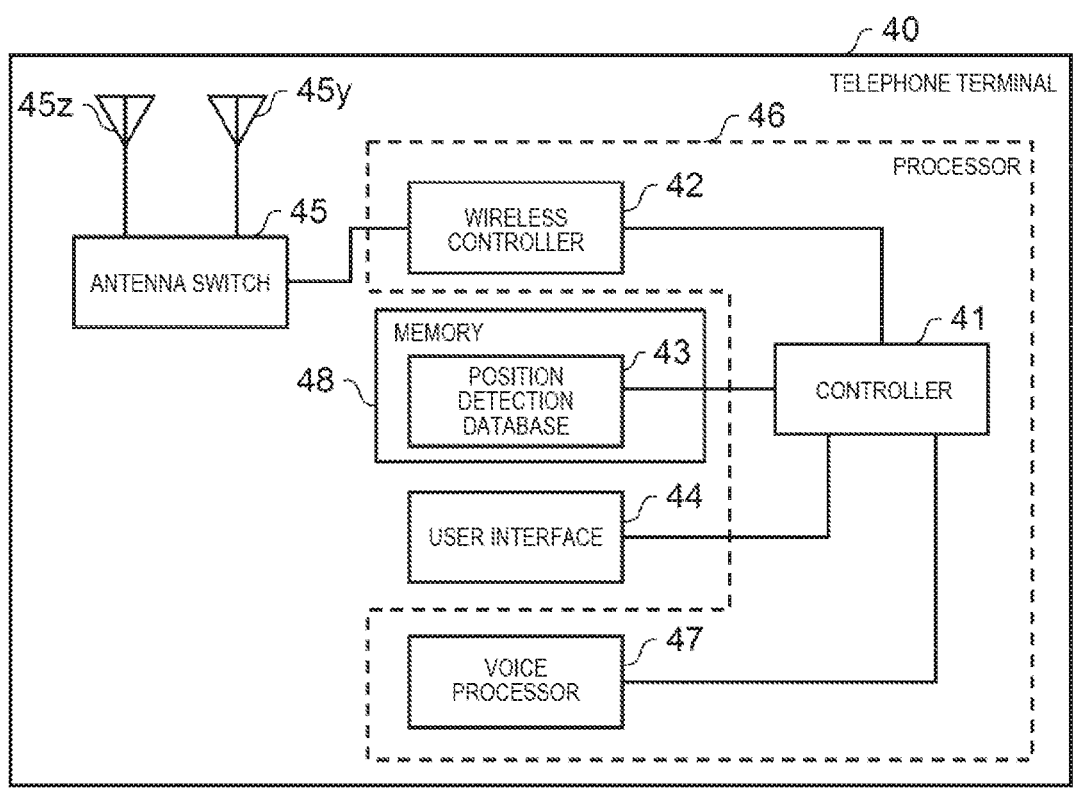
FIG. 6 is a block diagram illustrating an example of a configuration of a telephone terminal.

FIG. 6 is a block diagram illustrating a configuration of telephone terminal 40. Telephone terminal 40 is possessed by the user, and can be moved with movement of the user.

Telephone terminal 40 is a terminal which has the telephone function. Telephone terminal 40 includes processor 46, memory 48, user interface 44, and antenna switch 45. A plurality of antennas 45$z$ and 45$y$ are connected to antenna switch 45.

Processor 46 includes, for example, a CPU or a DSP. Processor 46 performs various processes and various controls in cooperation with memory 48. Specifically, processor 46 realizes functions of controller 41, wireless controller 42, and voice processor 47 by executing a program maintained in memory 48.

Memory 48 maintains, for example, various data, pieces of information, programs, tables, and database. Memory 48 may be embedded in processor 46. Memory 48 includes a primary storage device, and may include a secondary storage device. Memory 48 stores position detection database 43.

Controller 41 integrally controls operations of respective units of telephone terminal 40.

Wireless controller 42 is wirelessly connected to beacon terminals BT or wireless connection device 102, and performs wireless communication. Wireless controller 42 receives the beacon signals from wireless device 103.

Similar to position detection terminal 30 position detection database 43 stores a search table and a CS ranking table (not illustrated in the drawing). The search table and the CS ranking table are acquired from data of a result (search result) acquired by searching wireless device 103. Similar to position detection terminal 30, user interface 44 includes a display, operation buttons (not illustrated in the drawing), and the like.

Voice processor 47 encodes and decodes voice data communicated between voice processor 47 and telephone function sharing CS 10 to realize the telephone function.

Antenna switch 45 switches between a plurality of (for example, two) antennas 45$z$ and 45$y$ according to an instruction from wireless controller 42. Two antennas 45$z$ and 45$y$ are attached, for example, in different directivity directions, respectively. Antenna switch 45 performs switching to use an antenna in which a reception signal level is higher between, for example, two antennas 45$z$ and 45$y$.

Figure 7:
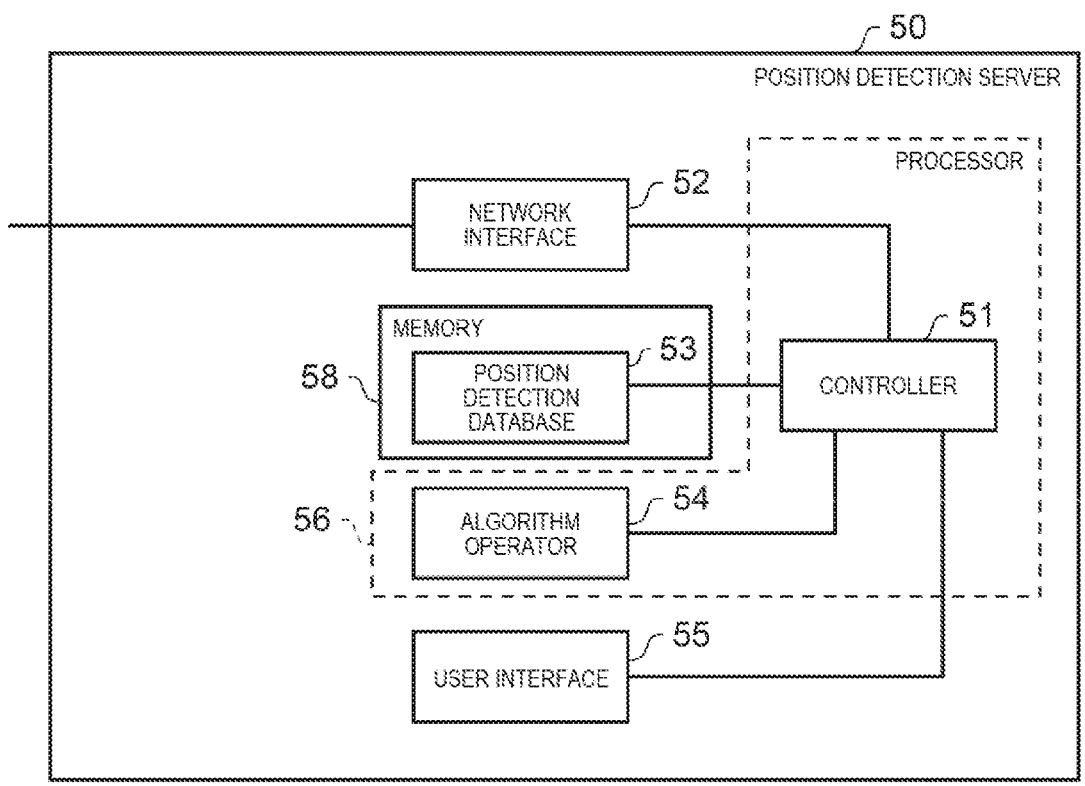
FIG. 7 is a block diagram illustrating an example of a configuration of a position detection server.

FIG. 7 is a block diagram illustrating a configuration of position detection server 50. Position detection server 50 detects a position of a terminal (for example, position detection terminal 30 or telephone terminal 40).

In the embodiment, position detection server 50 detects a planar position (two-dimensional position) of the terminal. Also, in addition to the planar position of the terminal, position detection server 50 may detect a position (three-dimensional position) in which a vertical direction (height direction) is considered.

Position detection server 50 includes network interface 52, processor 56, memory 58, and user interface 55.

Processor 56 includes, for example, a CPU or a DSP. Processor 56 performs various processes and various controls in cooperation with memory 58. Specifically, processor 56 realizes functions of controller 51 and algorithm operator 54 by executing a program maintained in memory 58.

Memory 58 maintains, for example, various data, pieces of information, programs, tables, and database. Memory 58 may be embedded in processor 56. Memory 58 includes a primary storage device, and may include a secondary storage device. Memory 58 stores position detection database 53.

Controller 51 integrally controls operations of respective units of position detection server 50.

Network interface 52 controls connection of IP network 8 to communicate data with PBX main device 70 through IP network 8.

Position detection database 53 stores reference data table 121 and measurement data table 125 which will be described later. In reference data table 121, data (reference data) of a result (search result) which is acquired by searching each of wireless connection devices 102 and is measured by each of beacon terminals BT, is registered. In measurement data table 125, radio wave intensity of radio waves, which is measured by the terminal (position detection terminal 30 or telephone terminal 40), from each of wireless devices 103, is registered.

In addition, in position detection database 53, positional information (for example, coordinate information with respect to a reference point) of each of wireless devices 103 is registered in advance. Also, reference data table 121 is registered before a sequence (see FIG. 11), which will be described later, of detecting a position is executed.

Algorithm operator 54 estimates the position of the terminal (for example, position detection terminal 30 or telephone terminal 40) according to a position detection algorithm which will be described later.

User interface 55 includes a display (for example, Light Emitting Diode (LED)), operation buttons (not illustrated in the drawing), and the like. The display displays, for example, the estimated position of position detection terminal 30 or telephone terminal 40 on a screen. The operation buttons are used, for example, in a case where an instruction to update reference data table 121 is notified to beacon terminals BT and wireless connection device 102 by the user. Also, user interface 55 may be omitted.

Similar to other devices, PBX main device 70 includes a processor and a memory. PBX main device 70 switches over telephones between a plurality of telephone terminals 40 which are respectively wirelessly connected to a plurality of telephone function sharing CSs 10, and switches over telephones between telephone terminals 40 and a fixed telephone which is connected to telephone NW 80. PBX main device 70 receives the data of the search result, which is acquired by position detection terminal 30 or telephone terminal 40, from each of telephone function sharing CSs 10 or the position detection CS, and transmits the data of the search result to position detection server 50. Also, PBX main device 70 may have a function of position detection server 50, and position detection server 50 may be omitted.

Similar to other devices, position checking terminal 60 includes a processor and a memory. For example, position checking terminal 60 is a general-purpose information terminal which includes a display function, and includes a Personal Computer (PC), a tablet terminal, a smart phone, and the like. Position checking terminal 60 displays an estimation result of the position of the terminal.

[Operation]

Subsequently, an operation of detecting a position performed by PBX system 5 will be described.

[Detection of Position of Terminal]

First, an overview of the operation of detecting the position will be illustrated. Here, since the operation of detecting the position of the terminal is the same in position detection terminal 30 and telephone terminal 40, here, position detection terminal 30 will be described as an example, and telephone terminal 40 will not be described because the operation of detecting the position of the terminal is the same. In the embodiment, an example is illustrated in which the position of position detection terminal 30, which is a detection target, is detected using three methods (A) to (C) which will be illustrated below.

(A) In a case where the detection target exists in a small cell of beacon terminal BT, PBX system 5 estimates that the detection target is located in a position of beacon terminal BT which has transmitted detected beacon signals using a small cell beacon method.

Figure 8:
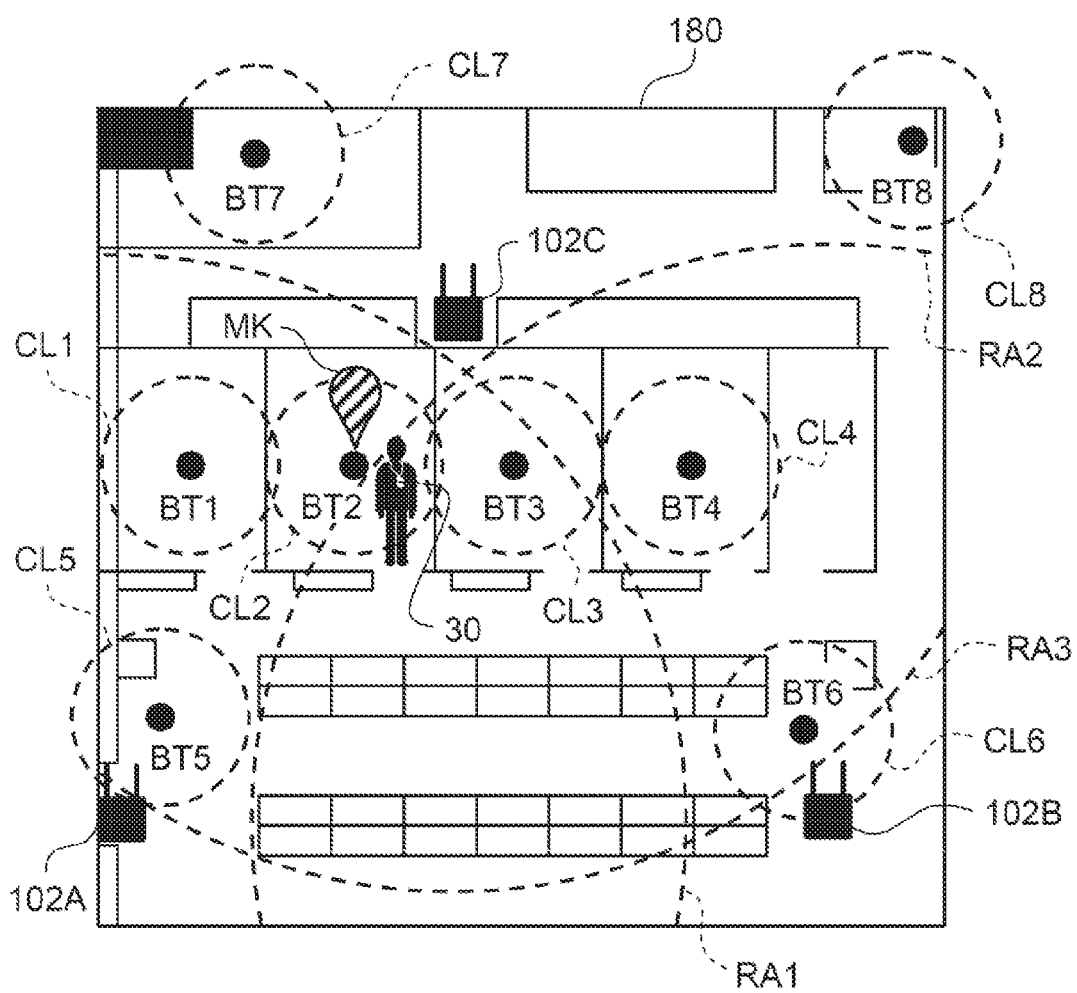
FIG. 8 is a schematic diagram illustrating an example of an operation of detecting a position using a small cell beacon method.

FIG. 8 is a schematic diagram illustrating the operation of detecting the position using the small cell beacon method. In the small cell beacon method, beacon terminals BT1 to BT8 are respectively installed in a plurality of positions which are designated in advance in room 180, and respectively form small cells CL1 to CL8.

In a case where position detection terminal 30 receives beacon signals in any one of small cells CL, position detection terminal 30 identifies beacon terminal BT which has transmitted the beacon signals. Position detection server 50 estimates that position detection terminal 30 is located in a position of identified beacon terminal BT.

In FIG. 8, as illustrated by position mark MK, it is estimated that position detection terminal 30 receives beacon signals transmitted from beacon terminal BT2 and exists in a position of beacon terminal BT2.

(B) In a case where the detection target exists on the outside of the small cells of beacon terminals BT, PBX system 5 specifies a position of beacon terminal BT, which is the closest to the detection target, using a positional fingerprint method, and estimates that the detection target is located in the position of relevant beacon terminal BT. The position detection method is also referred to as a first positional fingerprint method.

Figure 9:
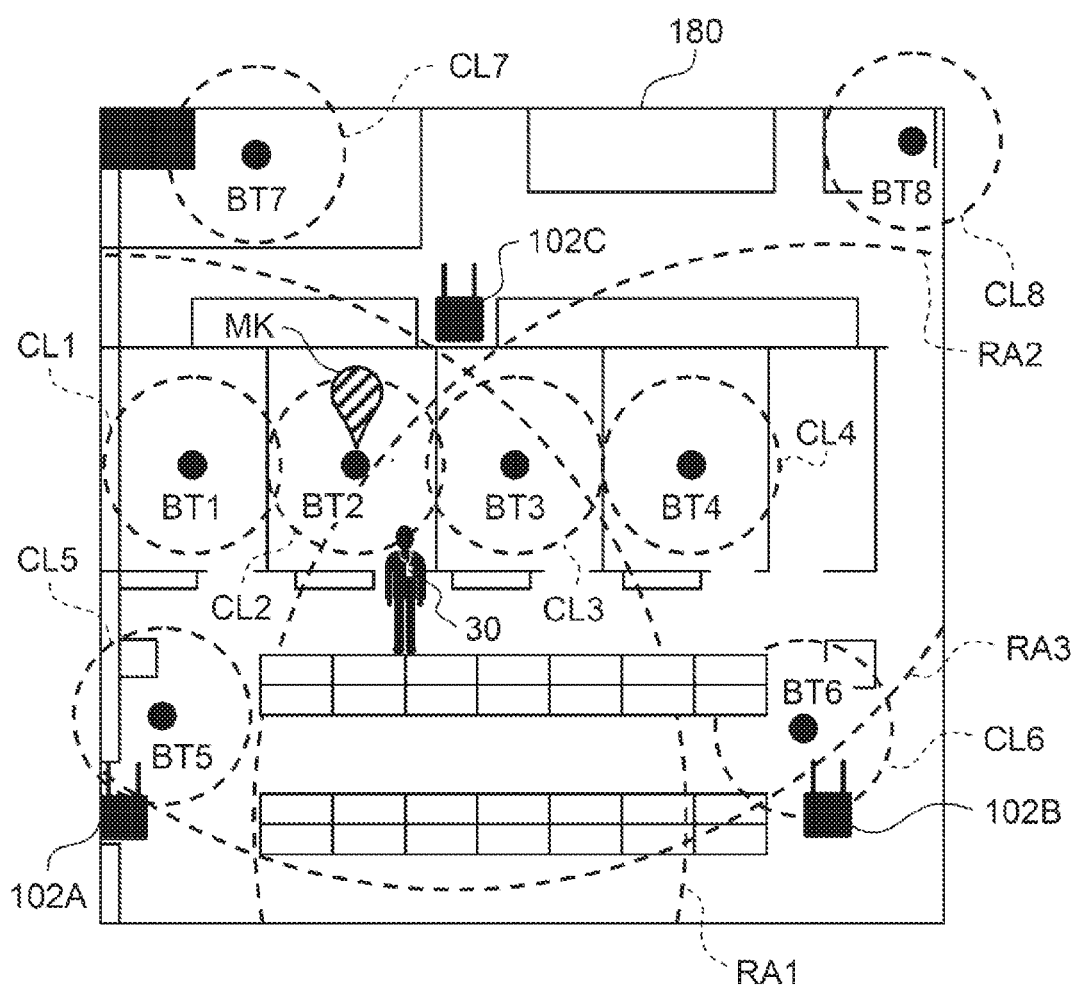
FIG. 9 is a schematic diagram illustrating an example of the operation of detecting the position using a positional fingerprint method.

FIG. 9 is a schematic diagram illustrating the operation of detecting the position using the first positional fingerprint method. In the first positional fingerprint method, beacon terminals BT1 to BT8 measure radio wave intensities of radio waves from a plurality of wireless connection devices 102A, 102B, and 102C in reception areas RA1 to RA3 of the plurality of respective wireless connection devices 102A to 102C. Beacon terminals BT1 to BT8 are respectively installed, for example, in a plurality of reference points (specified points) which are designated in advance. Position detection server 50 registers measurement results in position detection database 53 as reference data.

After the reference data is registered, position detection terminal 30 measures the radio wave intensities of the radio waves from the plurality of wireless connection devices 102A to 102C. Position detection server 50 calculates a degree of correlation (degree of similarity) between data of radio wave intensities (radio wave measurement data) measured by position detection terminal 30 and reference data of the radio wave intensities measured by beacon terminals BT. Furthermore, position detection server 50 specifies beacon terminal BT which has the highest degree of correlation. PBX system 5 estimates that position detection terminal 30 is located in a position of specified beacon terminal BT.

In FIG. 9 as illustrated by position mark MK, it is estimated that position detection terminal 30 exists in beacon terminal BT2.

(C) In a case where the detection target exists on the outside of the small cell of beacon terminal BT, the position of the detection target is estimated in such a way that candidates of positions of beacon terminals BT, which are close to the detection target, are specified using the positional fingerprint method, and a plurality of positions corresponding to the specified candidates are weighted. Here, the position detection method is also referred to as an extension-type positional fingerprint method or a second positional fingerprint method.

Figure 10:
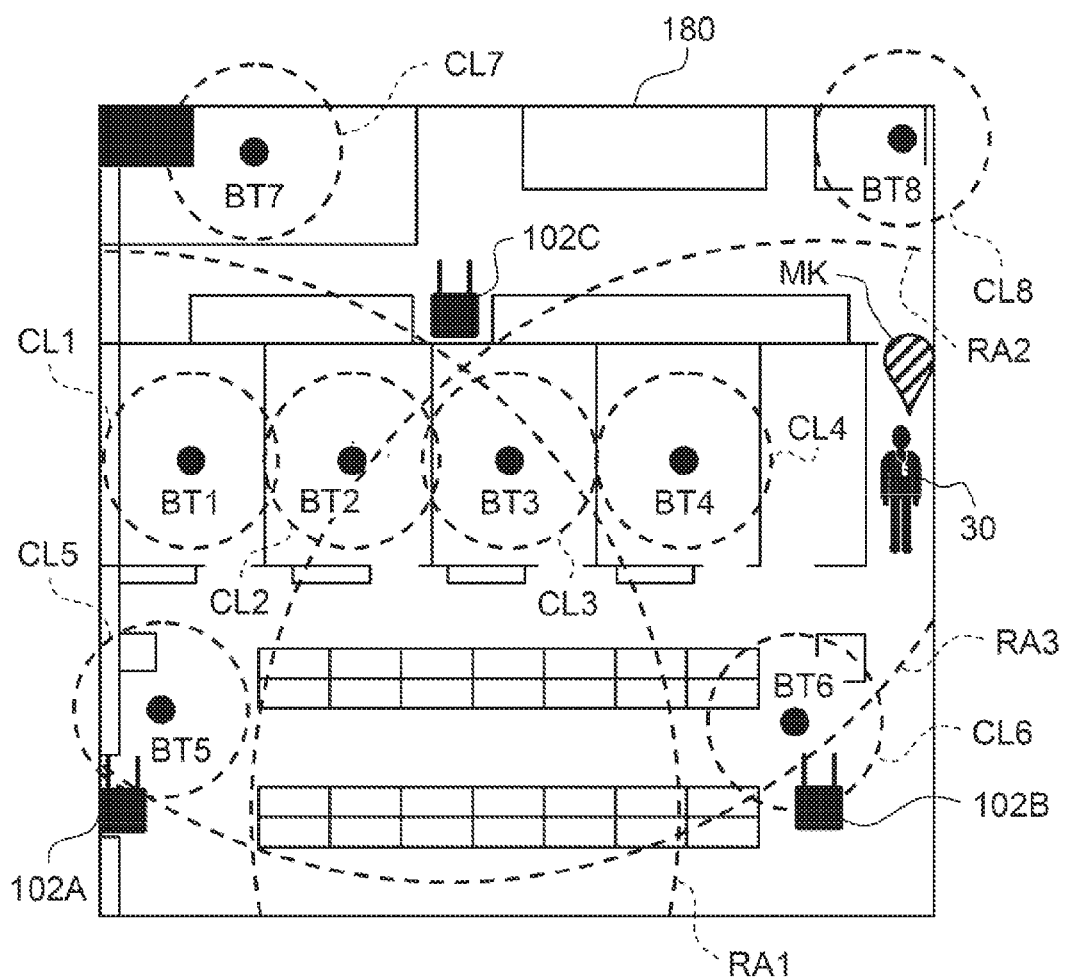
FIG. 10 is a schematic diagram illustrating an example of the operation of detecting the position using an extension-type positional fingerprint method.

FIG. 10 is a schematic diagram illustrating the operation of detecting the position using the second positional fingerprint method. Similar to (B), position detection terminal 30 measures the radio wave intensities of the radio waves from the plurality of wireless connection devices 102A to 102C in respective reception areas RA1 to RA3. PBX system 5 calculates a degree of correlation (degree of similarity) between the radio wave measurement data from position detection terminal 30 and the reference data from beacon terminals BT, and specifies a plurality of beacon terminals BT, in which the degree of correlation is high, as the candidates. The candidates of beacon terminals, which are specified here, include, for example, a plurality of beacon terminals, in which the degree of correlation is equal to or higher than a prescribed value, and a prescribed number of beacon terminals from a high degree of correlation. PBX system 5 weights the positions of the plurality of specified beacon terminals BT to estimate the position of position detection terminal 30.

In FIG. 10, as illustrated by position mark MK, it is estimated that position detection terminal 30 exists in a position which is close to, for example, beacon terminals BT4, BT6, and BT8 instead of the positions of beacon terminals BT.

According to the second positional fingerprint method, instead of the positions of beacon terminals BT, a position, which is closer to an actual position, is estimated as the position of position detection terminal 30.

Figure 11:
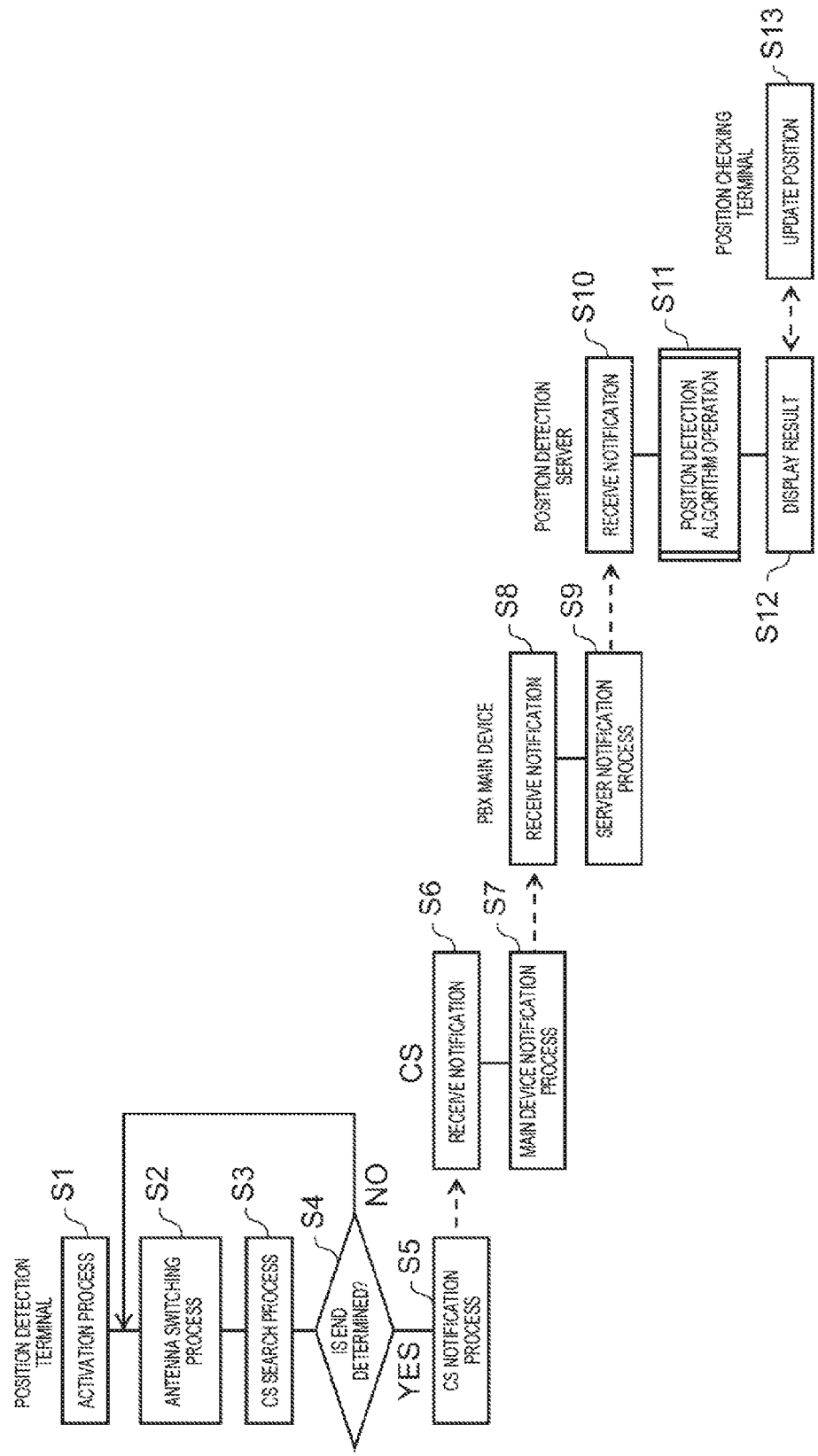
FIG. 11 is a sequence diagram illustrating an example of a sequence of detecting a position by a PBX system.

FIG. 11 is a sequence diagram illustrating a sequence of detecting a position performed by PBX system 5.

In position detection terminal 30, controller 31 is activated from a sleep state by the elapse of prescribed time, a request from position checking terminal 60, and the like (S1). The elapse of prescribed time is determined, for example, through counting performed by a timer embedded in position detection terminal 30. In addition, in a case where a position detection request is provided with respect to position detection server 50 from position checking terminal 60 and in a case where the position detection request is input with respect to position detection server 50 from the user, the request is transmitted to position detection terminal 30 from position detection server 50 through wireless connection device 102.

After controller 31 is activated, position detection terminal 30 first performs an antenna switching process (S2). In the antenna switching process, controller 31 detects, for example, reception signal levels for respective antennas 35z and 35y, drives antenna switch 35 to use a switch in which the reception signal level is higher, and selects any one of two antennas 35z and 35y.

Controller 31 performs a process (CS search process) of searching (detecting) wireless devices 103 (S3). In the CS search process, wireless controller 32 receives the beacon signals transmitted from each of wireless devices 103, and detects radio waves of the beacon signals or to measure radio wave intensities (electric field intensities). In addition, each of the beacon signals includes the identification information (for example beacon ID or a CS-ID) for identifying each of wireless devices 103.

Controller 31 determines whether or not to end the CS search process (S4). In the determination of whether or not to end the CS search process, for example, it is determined whether or not prescribed time (for example, 5 seconds) elapses from start of the CS search process or whether or not the number of detected wireless devices reaches a prescribed number (for example, 5). In a case where any one of conditions is satisfied, the CS search process ends.

In a case where the CS search process does not end in S4, position detection terminal 30 returns to S2 and repeats the same process.

In a case where the CS search process ends in S4, wireless controller 32 performs a CS notification process based on wireless device 103 in which radio wave signals are detected (S5).

In the CS notification process, wireless controller 32 transmits the data of the search result toward wireless connection devices 102. The data of the search result indicates a result (measurement result) of the search process, and includes, for example, the pieces of identification information of respective wireless devices 103, in which radio wave intensities are measured, and the respective measured radio wave intensities. In the data of the search result, for example, the pieces of information of respective wireless devices 103 are sorted in order that the measured radio wave intensity is high.

In wireless connection devices 102, in a case where wireless controller 12 or wireless controller 22 receives the data of the search result which is notified by position detection terminal 30 (S6), wireless controller 12 or wireless controller 22 transfers the data of the search result to PBX main device 70 (S7).

In PBX main device primary 70, in a case where wireless controller (not illustrated in the drawing) receives the data of the search result, which is transferred from wireless connection devices 102 (S8), wireless controller transfers the data of the search result to position detection server 50 (S9).

In position detection server 50, in a case where network interface 52 receives the data of the search result, which is transferred from PBX main device 70 (S10), network interface 52 stores the data of the search result in position detection database 53 and registers the data of the search result in measurement data table 125 (see FIG. 14).

Algorithm operator 54 performs a position detection algorithm operation, and estimates the position of position detection terminal 30 (S11). Details of the position detection algorithm operation will be described later.

In position detection server 50, controller 51 causes information of the estimated position of position detection terminal 30 to be stored in position detection database 53 and causes the information to be displayed on a display of user interface 55 (S12). In this case, display may display the information of the estimated position of position detection terminal 30 using two-dimensional coordinate data or may display the information of the estimated position of position detection terminal 30 to overlap a map.

In position checking terminal 60, communication controller (not illustrated in the drawing) requests the information of the position of position detection terminal 30 at position detection server 50 to receive the information of the position of position detection terminal 30 from position detection server 50. The display (not illustrated in the drawing) displays the information of the position of position detection terminal 30 (S13). An aspect of the display may be the same as or may be different from position detection server 50.

Also, the information of the position of position detection terminal 30 may be regularly delivered, for example, from position detection server 50 to position checking terminal 60 and may be appropriately updated. Timing of update includes, for example, timing at which an input notifying a change of a layout of room 180 is received, and timing at which prescribed time elapses from previous update.

Figure 12:
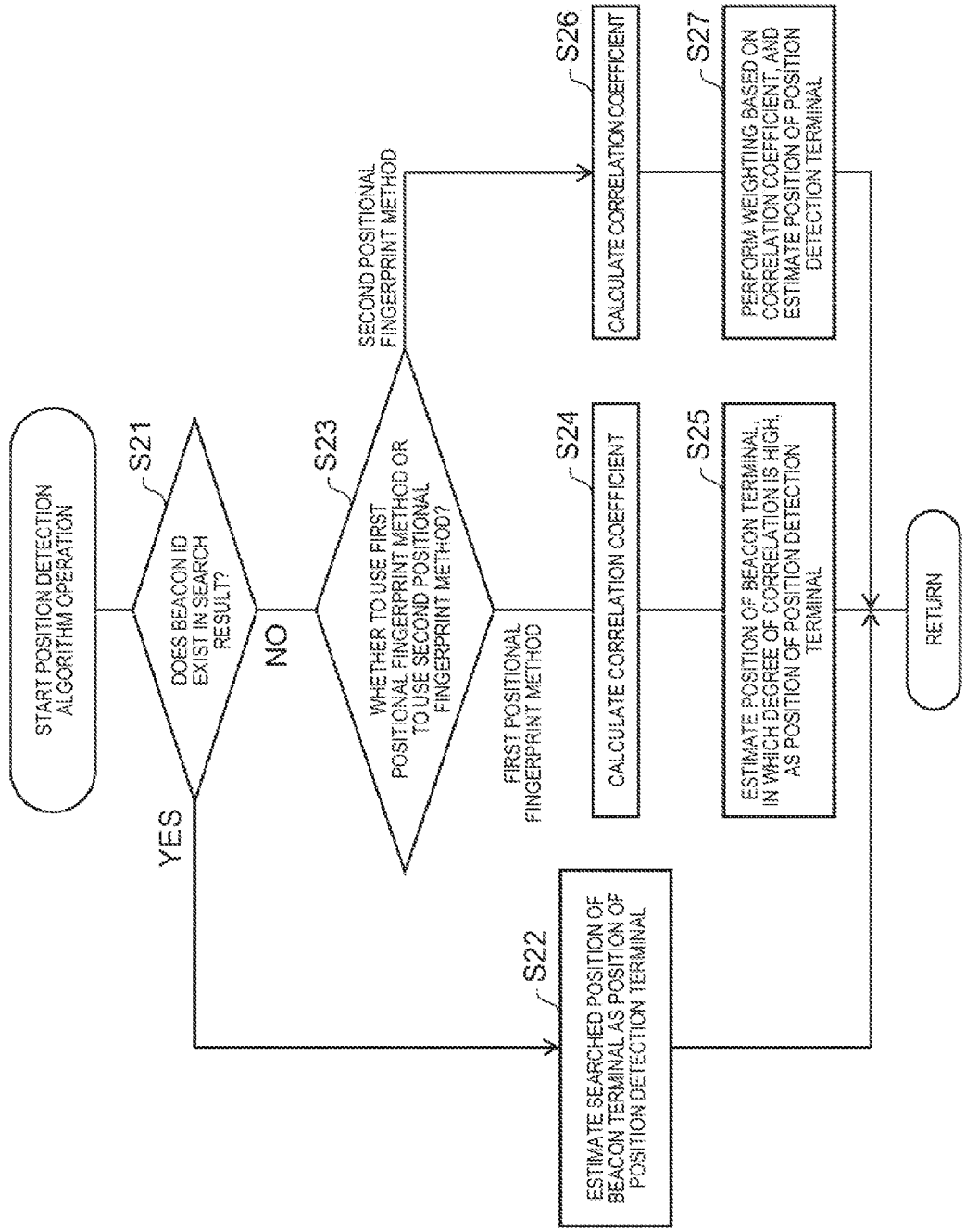
FIG. 12 is a flowchart illustrating an example of a processing procedure of a position detection algorithm operation by a position detection server.

FIG. 12 is flowchart illustrating a processing procedure of the position detection algorithm operation performed by algorithm operator 54 of position detection server 50 in S11.

Algorithm operator 54 determines whether or not the data of the search result, which is delivered from position detection terminal 30, includes a beacon ID of beacon terminal BT which has transmitted the beacon signals (S21).

In a case where the beacon ID is included, algorithm operator 54 detects a position of beacon terminal BT, which has the beacon ID, according to the small cell beacon method. Algorithm operator 54 estimates that position detection terminal 30 is located in the position of relevant beacon terminal BT (S22). Thereafter, algorithm operator 54 returns to an original process (process in FIG. 11).

In a case where the beacon ID is not included in the data of the search result in S21, that is, in a case where position detection terminal 30 does not detect the beacon signals from beacon terminals BT, algorithm operator 54 detects the position of position detection terminal 30 according to the positional fingerprint method. In this case, algorithm operator 54 determines whether to use the first positional fingerprint method or the second positional fingerprint method (S23).

Also, whether to use the first positional fingerprint method or the second positional fingerprint method may be set in advance by taking, for example, position accuracy, process time, and the like, which are requested by the user, into consideration, and may be maintained in memory 58. In addition, whether to use the first positional fingerprint method or the second positional fingerprint method may be set by taking the position accuracy, the process time, and the like, which are acquired by algorithm operator 54, into consideration.

In a case where the first positional fingerprint method is used, algorithm operator 54 calculates correlation coefficient r (S24). In a case where correlation coefficient r is calculated, the reference data, which is registered in reference data table 121, or data of the radio wave intensity, which is registered in measurement data table 125 is used, reference data table 121 and measurement data table 125 being stored in position detection database 53.

FIG. 13 is a schematic diagram illustrating registration content of reference data table 121. Reference data table 121 is prepared before starting execution of the sequence of detecting a position illustrated in FIG. 11, and is stored in position detection database 53 of position detection server 50. Reference data table 121 stores the reference data, for example, in a table format. The reference data includes, for example, pieces of positional information of the specified points (for example, pieces of information of coordinates), and pieces of information of the radio wave intensities of the beacon signals from respective wireless connection devices 102.

In reference data table 121, first reference data, which is measured in the positions of beacon terminals BT as the specified points, is registered. In addition, in reference data table 121, second reference data, which is measured in the positions of wireless connection devices 102 as the specified points, may be registered.

In FIG. 13, "CS-A", "CS-B", "CS-C", "CS-D", . . . are used a the pieces of identification information (CS-ID) of the plurality of wireless connection devices 102.

For example, radio wave intensity from wireless connection device 102 corresponding to identification information "CS-A", which is measured by beacon terminal BT1, is −62 dBm. Radio wave intensity from wireless connection device 102 corresponding to identification information "CS-B", which is measured by beacon terminal BT1, is −76 dBm. Radio wave intensity from wireless connection device 102 corresponding to identification information "CS-D" which is measured by beacon terminal BT1, is −80 dBm.

In addition, radio wave intensities from respective wireless connection devices 102, which are measured by beacon terminal BT2, are also registered in the same manner. In addition, radio wave intensities from pieces of identification information "CS-B", "CS-C", and "CS-D", which are measured by wireless connection device 102 corresponding to identification information "CS-A", are also registered in the same manner.

Also, radio wave intensity of the beacon signals, which is measured by wireless connection device 102 corresponding to identification information "CS-A" and is transmitted by the device (wireless connection device 102 corresponding to identification information "CS-A"), may be registered together.

FIG. 14 is a diagram illustrating registration content of measurement data table 125. Measurement data table 125 is generated based on data of the radio wave intensity which is received by position detection server 50 from position detection terminal 30. Measurement data table 125 is prepared in the middle of or before execution of the sequence of detecting a position illustrated in FIG. 11, and is stored in position detection database 53 of position detection server 50. The radio wave measurement data includes information of radio wave intensity of the beacon signal from each wireless connection device 102.

In FIG. 14, radio wave intensity, which is measured by position detection terminal 30 whose terminal ID is "Term-A", is registered in measurement data table 125.

For example, the radio wave intensity from wireless connection device 102 corresponding to "CS-A" is −60 dBm. The radio wave intensity from wireless connection device 102 corresponding to "CS-B" is −72 dBm. The radio wave intensity from wireless connection device 102 corresponding to "CS-D" is −78 dBm.

Algorithm operator 54 calculates correlation coefficient r between position detection terminal 30 and each wireless device 103 according to (Equation 1) using the data registered in reference data table 121 and measurement data table 125. Correlation coefficient r has a value in a range of a value of −1 to a value of 1.

$$\text{correlation coefficient } r = \frac{\sum ((x_i - \bar{x})(y_i - \bar{y}))}{\sqrt{(\sum (x_i - \bar{x})^2 (y_i - \bar{y})^2}} \quad \text{(Equation 1)}$$

Here, $x_i$ indicates the radio wave intensity from each of wireless connection devices 102 which are measured by wireless device 103. i expresses an identification number of the wireless device. x—(x's over line) indicates an average value of the radio wave intensities from respective wireless connection devices 102 which are measured by wireless device 103. $y_i$ indicates radio wave intensity from each of wireless connection devices 102 which are measured by position detection terminal 30. y—(y's over line) indicates an average value of the radio wave intensities from respective wireless connection devices 102 which are measured by position detection terminal 30.

For example, algorithm operator 54 calculates correlation coefficient $r_A$ of beacon terminal BT1 using reference data table 121 illustrated in FIG. 13 and measurement data table 125 illustrated in FIG. 14 according to (Equation 1). In this case, correlation coefficient $r_A$ of beacon terminal BT1 is "0.99278". In the same manner, algorithm operator 54 calculates correlation coefficient $r_B$ of beacon terminal BT2. In this case, correlation coefficient $r_B$ of beacon terminal BT2 is "0.05764".

Accordingly, algorithm operator 54 determines that a degree of correlation between the position of beacon terminal BT1 and the position of position detection terminal 30 is larger than a degree of correlation between the position of beacon terminal BT2 and the position of position detection terminal 30.

For example, algorithm operator 54 specifies wireless device 103, in which a value of correlation coefficient r is the closest to a value of 1, that is, correlation coefficient r is the maximum, among a plurality of wireless devices 103 based on each of calculated correlation coefficients r. Algorithm operator 54 estimates that position detection terminal 30 is located in the position of specified wireless device 103 (S25).

Therefore, in FIG. 9, although the position of position detection terminal 30 exists on the outside of small cell CL2 of beacon terminal BT2, the position of beacon terminal BT2 is detected as the position of beacon terminal BT2. Thereafter, algorithm operator 54 returns to the original process (process of FIG. 11).

In a case where the second positional fingerprint method is used in S23, algorithm operator 54 calculates the correlation coefficient in order to detect the position of position detection terminal 30 according to the second positional fingerprint method (S26). Similar to S24, algorithm operator 54 calculates correlation coefficient r between position detection terminal 30 and each of wireless devices 103 using data registered in reference data table 121 and measurement data table 125 in S26.

Furthermore, algorithm operator 54 estimates the position of position detection terminal 30 by weighting the position of each of wireless devices 103 using correlation coefficient r according to (Equation 2) (S27). In this case, the position of position detection terminal 30 is estimated to be closer to an actual position instead of the position of beacon terminal BT. In addition, the position of position detection terminal 30 is expressed by, for example, position coordinates (X, Y) in which a reference point (for example, a corner or a center of room 180) which is set in advance is used as an original point.

$$X = \frac{r_A}{r_A + r_B} X_1 + \frac{r_A}{r_A + r_B} X_2$$
$$Y = \frac{r_A}{r_A + r_B} Y_1 + \frac{r_A}{r_A + r_B} Y_2$$

(Equation 2)

Here, $r_A$ is a correlation coefficient of beacon terminal BT1. $r_B$ is a correlation coefficient of beacon terminal BT2. X1 and Y1 are values of an X coordinate and a Y coordinate which express the position of beacon terminal BT1, respectively. X2 and Y2 are values of an X coordinate and a Y coordinate which express the position of beacon terminal BT2, respectively.

In FIG. 10, as illustrated by position mark MK, the position of position detection terminal 30 exists on the outside of small cell CL7 of beacon terminal BT7, and is estimated based on, for example, radio wave intensities of beacon signals from beacon terminals BT4 and BT6.

Here, an example is illustrated in which the position of position detection terminal 30 is calculated by weighting the positions of two wireless devices 103. Also, the position of position detection terminal 30 may be calculated by weighting the positions of three or more wireless devices 103. For example, the position of position detection terminal 30 may be estimated based on radio wave intensities of the beacon signals from beacon terminals BT4, BT6, and BT8. Thereafter, algorithm operator 54 returns to the original process (process of FIG. 11).

[Update of Reference Data]

Subsequently, an operation of updating the reference data will be described.

Figure 15:
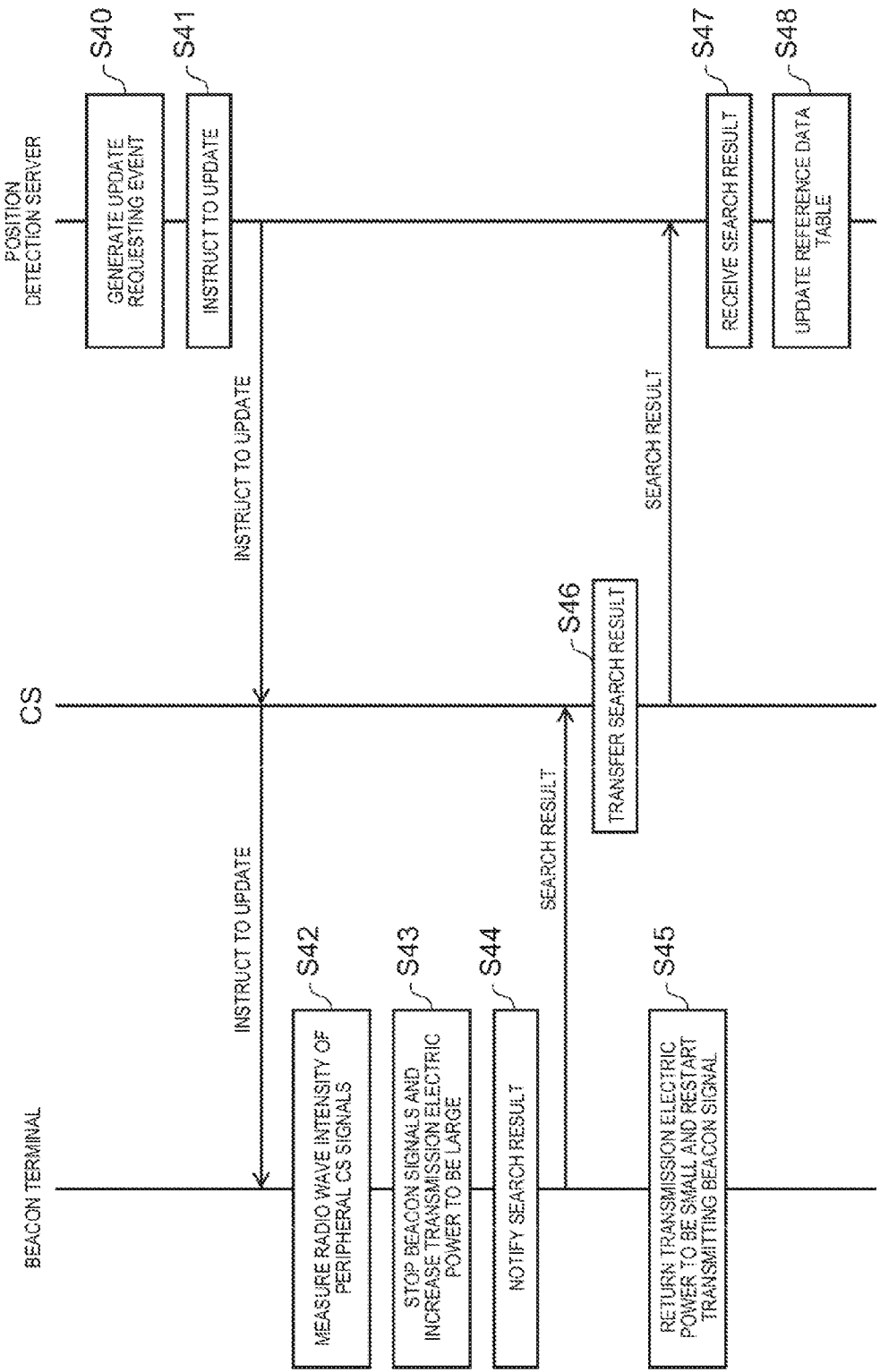
FIG. 15 is a sequence diagram illustrating an example of a sequence of updating reference data by the PBX system.

FIG. 15 is a sequence diagram illustrating a sequence of updating the reference data by PBX system 5.

First, in a case where a prescribed event is generated (S40), network interface 52 in position detection server 50 performs an instruction to request update with respect to each of beacon terminals BT through PBX main device 70 and wireless connection device 102 (S41). The prescribed event is an event for updating reference data table 121 stored in position detection database 53.

The event is generated, for example, in a case where a layout of room 180, in which beacon terminals BT are disposed, is changed. The event may include an event in which position checking terminal 60 notifies position detection server 50 of change or the like in a layout in such a way that the user operates position checking terminal 60. In addition, the event may include an event in which the user inputs the change or the like in the layout by operating user interface 55 of position detection server 50 without passing through position checking terminal 60.

In addition, the event may include an event which is regularly (for example, in a case where time set by a timer is clocked or at a predetermined time every day) generated by position detection server 50 without notifying the event by the user. In addition, the event may include an event which is regularly generated by wireless device 103 and is notified to position detection server 50.

In each of beacon terminals BT, wireless controller 92 receives an update request instruction from position detection server 50. Controller 91 searches for the beacon signals which are transmitted by wireless connection device 102 and measures the radio wave intensities of the beacon signals according to the update request instruction (S42). Also, wireless controller 92 may not receive the update request instruction from wireless connection device 102, and wireless connection device 102 may regularly search for the beacon signals according to activation of the timer and may measure the radio wave intensities.

In a case where controller 91 ends the measurement of the radio wave intensities, controller 91 stops transmitting the beacon signals and increases transmission electric power (S43).

Wireless controller 92 notifies wireless connection device 102 of data of the search a result with the increased transmission electric power (S44). Wireless connection device 102 is, for example, wireless connection device 102 which is the closest to beacon terminals BT.

After the process in S44 is performed, controller 91 decreases the transmission electric power to return to an original state, and wireless controller 92 restarts transmitting the beacon signal (S45).

In a case where wireless controller 12 or wireless controller 22 receives the data of the search result notified by beacon terminals BT, wireless connection device 102 transfers the data of the search result to position detection server 50 through PBX main device 70 (S46).

In a case where network interface 52 in position detection server 50 receives the data of the search result from beacon terminals BT (S47), controller 51 updates reference data table 121, which is stored in position detection database 53, based on the data of the search result (S48). For example, in a case where the data of the search result is received from beacon terminal BT1, controller 51 updates the first reference data which is stored in position detection database 53 and is relevant to beacon terminal BT1.

Also, similar to beacon terminals BT, wireless connection device 102 may be installed in the specified point, and wireless controller 12 or wireless controller 22 may search for beacon signals which are transmitted by wireless connection devices 102 that presents in a vicinity. In addition, wireless controller 12 or wireless controller 22 may measure the radio wave intensities and may transmit the data of the search result to position detection server 50. In this case, in a case where wireless controller 12 or wireless controller 22 receives the data of the search result from beacon terminals BT, wireless controller 12 or wireless controller 22 may transmit the data of the search result to position detection server 50 together with data of the search result of the device (wireless connection device 102).

In a case where network interface 52 in position detection server 50 receives the data of the search result from wireless connection devices 102, controller 51 updates reference data table 121, which is stored in position detection database 53, based on the data of the search result (S48). For example, in a case where the data of the search result is received from wireless connection device 102A, controller 51 updates the second reference data which is stored in position detection database 53 and is relevant to wireless connection device 102A.

PBX system 5 performs the operation of detecting the position illustrated in FIG. 11 using the updated reference data.

[Acquisition of Reference Data by Wireless Connection Device]

Figure 16:
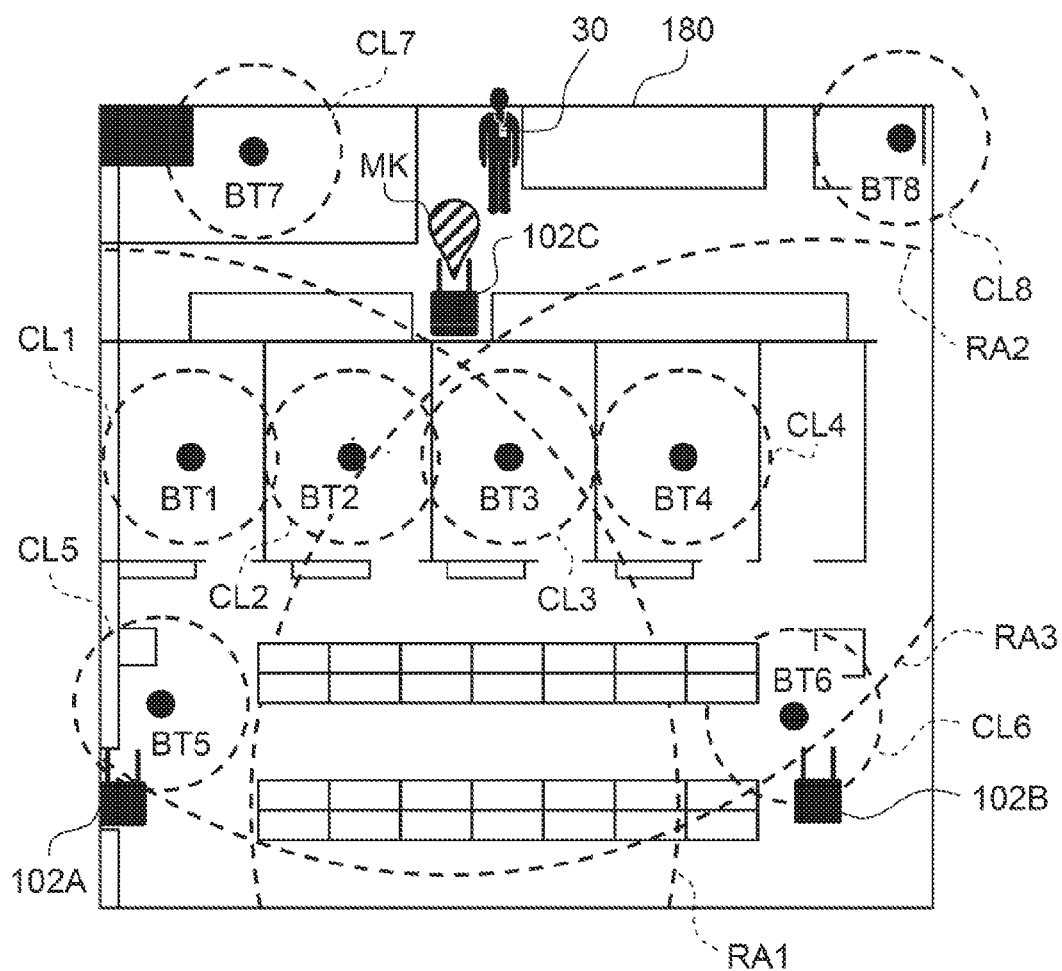
FIG. 16 is a schematic diagram illustrating an example of an operation of acquiring the reference data through a search process performed by a wireless connection device.

FIG. 16 is a schematic diagram illustrating an operation of acquiring the reference data through a search process performed by wireless connection device 102.

For example, wireless connection device 102A searches for beacon signals transmitted by other wireless connection devices 102B and 102C including wireless connection device 102A, which are located in positions that are set as reference points (specified points), and measures the radio wave intensities of the beacon signals. In this manner, wireless connection device 102A acquires the data of the search result (reference data).

Similar to the data of the search result acquired by each of beacon terminals BT, the data of the search result, which is acquired by wireless connection device 102A, transmitted to position detection server 50 and is registered as the reference data of reference data table 121 (see FIG. 13). Also, similarly, other wireless connection devices 102B and 102C acquire the dot of the search result, and register the data of the search result as the reference data.

As a result, in addition to the reference data (first reference data) acquired by each of beacon terminals BT, reference data (second reference data) acquired by each of wireless connection devices 102 is added. Therefore, PBX system 5 is capable of increasing the reference data registered in reference data table 121 which is stored in position detection database 53. In a case where the reference data increases, position detection server 50 is capable of improving accuracy of detecting the position using the positional fingerprint method.

In FIG. 16, algorithm operator 54 detects the position of position detection terminal 30 according to the first positional fingerprint method or the second positional fingerprint method using reference data table 121 in which reference data acquired by each of wireless connection devices 102 are increased. As a result, algorithm operator 54 estimates the position of wireless connection device 102A as a position where position detection terminal 30 exists, as illustrated by position mark MK.

[Advantage]

According to the operation of detecting the position performed by PBX system 5, position detection server 50 is capable of acquiring and registering the reference data using beacon signals transmitted by wireless device 103. Therefore, in a case where a system of PBX system is installed, labors, in which the user moves to the respective specified points (reference points) and measures the radio wave intensities of radio waves from wireless connection devices 102 in the positions, are saved. Therefore, maintenance of PBX system 5 is not required, and thus it is easy to introduce a system.

In addition, in a case where position detection terminal 30 detects beacon terminals BT using the beacon signals, PBX system 5 uses the small cell beacon method. In this case, the small cell is small compared to a radius of cell of wireless connection device 102, position detection server 50 is capable of increasing accuracy of detecting the position of position detection terminal 30. In addition, compared to the positional fingerprint method, it is possible to omit the operation of the correlation coefficient or the like. Therefore, position detection server 50 is capable of reducing process loads required for the operation of detecting the position and is capable of reducing time required for the operation of detecting the position.

In addition, in a case where position detection terminal 30 does not detect any one of beacon terminals BT using beacon signals, PBX system 5 uses the first positional fingerprint method or the second positional fingerprint method. In a case where the first positional fingerprint method is used, position detection server 50 is capable of estimating the position of position detection terminal 30 even in a case where position detection terminal 30 exists on the outside of areas of the small cells of beacon terminals BT and it is difficult to use the small cell beacon method. In a case where the second positional fingerprint method is used, position detection server 50 is capable of improving accuracy of detecting the position of position detection terminal 30 even in the case where position detection terminal 30 exists on the outside of the areas of the small cells of beacon terminals BT.

According to the reference data updating operation performed by PBX system 5, even in a case where communication environment (for example, communication environment of room 180) of PBX system 5 is changed due to layout alternation or the like, position detection server 50 is capable of acquiring the reference data on which the communication environment acquired after the change is reflected. Furthermore, position detection server 50 performs the operation of detecting the position using the reference data acquired after update, and thus position detection server 50 is capable of reducing influence due to the change in the communication environment, thereby estimating the position of position detection terminal 30.

In addition, in a case where the reference data is updated, labors, in which the user moves to the respective specified points (reference points) and measures the radio wave intensities of radio waves from wireless connection devices 102 in the respective positions, are saved. Therefore, maintenance of PBX system 5 is not required, and thus it is easy to introduce a system.

As described above, PBX system 5 includes position detection terminal 30, the plurality of beacon terminals BT, wireless connection device 102, and position detection server 50. Beacon terminals BT, which are installed in the plurality of prescribed positions, transmit weak radio waves (beacon signals) and form small cells CL which are radio wave arrival areas (reception area). Wireless connection device 102 installed in the prescribed position, transmits radio waves (beacon signals) with radio wave intensity higher than radio waves transmitted by beacon terminals BT.

Position detection terminal 30 measures (detects) the radio waves from beacon terminals BT or wireless connection device 102, and transmits a measurement result to position detection server 50 through wireless connection device 102.

Position detection server 50 registers the radio wave intensity, which is the search result measured by beacon terminals BT, from wireless connection device 102 in reference data table 121 of position detection database 53 in advance as the first reference data.

Position detection server 50 receives the measurement result from position detection terminal 30. In a case where the measurement result includes information of radio waves from beacon terminal BT, position detection server 50 estimates that position detection terminal 30 is located in a position of relevant beacon terminal BT. That is position detection server 50 estimates the position of position detection terminal 30 according to the small cell beacon method.

In contrast, in a case where measurement result does not include the radio waves from beacon terminals BT, position detection server 50 estimates the position of position detection terminal 30 based on radio wave measurement data of radio wave intensity, which is included in the measurement result, from wireless connection device 102, the first reference data which is maintained in position detection database 53, and positional information of beacon terminals BT. That is, position detection server 50 estimates the position of position detection terminal 30 according to the positional fingerprint method.

PBX system 5 is an example of a position detection system. Position detection terminal 30 is an example of a first terminal. Beacon terminals BT are examples of second terminals.

As described above, position detection server 50 may switch between the small cell beacon method and the positional fingerprint method according to whether or not the radio waves of beacon terminals BT are detected. Therefore, compared to a case where position detection is performed using only the small cell beacon method, PBX system 5 is capable of reducing installment density of beacon terminals BT and is capable of reducing increase in the number of beacon terminals BT by combining with the positional fingerprint method. Accordingly, PBX system 5 is capable of inhibiting an increase in system costs. In addition, compared to the positional fingerprint method according to the related art, PBX system 5 is capable of improving accuracy of detecting the position of position detection terminal 30 according to the positional fingerprint method by installing beacon terminals BT in addition to wireless connection device 102 and increasing reference data.

As described above, according to PBX system 5, it is possible to inhibit an increase in system costs and improve accuracy of detecting the position of the terminal (position detection terminal 30 or telephone terminal 40).

In addition, in a case where beacon terminals BT search for beacon signals, which are transmitted from respective wireless connection devices 102, and measure radio wave intensities of the beacon signals, the reference data is generated. Therefore, it is not necessary for the user to grasp and move the terminal for measurement in advance and to measure radio wave intensities from respective wireless connection devices 102 using the terminal for measurement in the respective specified points. That is, PBX system 5 is not needed to perform initial survey, and thus introduction or construction of the system becomes simple.

In addition, in a case where the search result does not include information of the radio waves from beacon terminals BT, position detection server 50 may derive correlation coefficient r between the positions of beacon terminals BT and the position of position detection terminal 30 with respect to respective beacon terminals BT according to, for example, (Equation 1). Position detection server 50 may estimate that position detection terminal 30 is located in the position of beacon terminal BT, which has the largest degree of correlation, based on correlation coefficient r. Correlation coefficient r is an example of correlation information. Also, in a case where the degree of correlation is the largest, correlation coefficient r becomes the maximum.

Therefore, even in a case where it is difficult for position detection terminal 30 to receive radio waves from beacon terminals BT using the small cell beacon method, position detection server 50 is capable of detecting the position of position detection terminal 30 using the first positional fingerprint method.

In addition, position detection server 50 may estimate the position of position detection terminal 30 based on, for example, each correlation coefficient r and positional information of each beacon terminal BT according to (Equation 2).

Therefore, even in a case where position detection terminal 30 exists on the outside of the reception areas of beacon terminals BT, PBX system 5 uses the second positional fingerprint method, and thus it is possible to improve the accuracy of detecting the position of position detection terminal 30 using the first positional fingerprint method.

In addition, position detection server 50 may register the first reference data and the second reference data in reference data table 121 stored in position detection database 53. The first reference data includes information of radio wave intensity from wireless connection device 102 measured by beacon terminals BT. The second reference data includes information of radio wave intensity from wireless connection device 102 measured by wireless connection device 102. Position detection server 50 may estimate the position of position detection terminal 30 based on information of radio wave intensity of radio waves, which is included in the measurement result, from wireless connection device 102, the first reference data, the second reference data, the positional information of beacon terminals BT, and the positional information of wireless connection device 102.

Therefore, PBX system 5 is capable of increasing the number of reference data, and improves accuracy of detecting a position in a case where the position of position detection terminal 30 is estimated using the first positional fingerprint method or the second positional fingerprint method.

In addition, position detection terminal 30 and beacon terminals BT may transmit the measurement result and the reference data to position detection server 50 through wireless connection device 102 and PBX main device 70.

Therefore, in a case where simple alternation is added to PBX system using existing PBX main device 70, it is possible to realize PBX system 5 according to the embodiment.

In addition, in PBX system 5, beacon terminals BT measure radio wave intensity of radio waves from the plurality of wireless connection devices 102, and generate the first reference data which includes information of the radio wave intensity. Beacon terminals BT transmit the first reference data to position detection server 50 through any one of wireless connection devices 102.

Position detection server 50 receives the measurement result acquired by position detection terminal 30 and the first reference data transmitted from beacon terminals BT. Position detection server 50 updates the first reference data, which is stored in advance in position detection database 53 that is stored in memory 58, using the received first reference data. The position detection server 50 estimates the position of position detection terminal 30 based on the measurement result, the updated first reference data of reference data table 121, and positional information of beacon terminals BT.

Therefore, even in a case where the communication environment is changed in system installment environment as in a case of layout alternation of the room, it is possible to immediately update the reference data. The updated reference data is data on which the communication environment acquired after the change is reflected. Accordingly, it is possible to improve accuracy of detecting a position of the terminal in the changed environment.

As described above, according to PBX system 5, even in a case where the communication environment of PBX system 5 is changed, it is possible to inhibit the deterioration in accuracy of detecting the position of the terminal (position detection terminal 30, telephone terminal 40) after the communication environment is changed.

In addition, position detection server 50 may receive an update instruction to update reference data table 121 through user interface 55, and may transmit the update instruction to beacon terminals BT through wireless connection device 102. Beacon terminals BT may measure radio wave intensities of radio waves from the plurality of wireless connection devices 102 according to the received update instruction.

Therefore, for example, PBX system 5 is capable of acquiring the reference data, on which radio waves environment acquired after change is reflected in a case where the user notices the change in the communication environment, and is capable of improving accuracy of detecting the position.

In addition, position detection server 50 may regularly transmit an update instruction to update reference data table 121 to beacon terminals BT through wireless connection device 102. Beacon terminals BT may regularly measure radio wave intensity of radio waves from the plurality of wireless connection devices 102 according to the received update instruction.

Therefore, for example, even in a case where the user does not notice the change in the communication environment, PBX system 5 is capable of acquiring the reference data, on which the radio waves environment acquired after the change is reflected, and is capable of improving accuracy of detecting the position.

In addition, at least one wireless connection device 102 of the plurality of wireless connection devices 102 may measure radio wave intensity of radio waves from each wireless connection device 102, may generate the second reference data which includes the radio wave intensity, and may transmit the second reference data to position detection server 50. Position detection server 50 may receive the second reference data, and may update the second reference data, which is stored in advance in position detection database 53 that is stored in memory 58, using the received second reference data. Position detection server 50 may estimate the position of position detection terminal 30 based on the measurement result, the updated first reference data, the updated second reference data, the positional information of beacon terminals BT, and positional information of wireless connection device 102.

Therefore, PBX system 5 is capable of increasing the number of updated reference data, and is capable of improving accuracy of detecting the position of position detection terminal 30 using the first positional fingerprint method or the second positional fingerprint method.

In addition, in a case where the first reference data is transmitted, beacon terminals BT may stop the beacon signal and may increase the radio wave intensity rather than the first radio wave intensity.

Therefore, beacon terminals BT are capable of securely communicating with wireless connection device 102 and is capable of transmitting the first reference data.

Another Embodiment

As described above, the first embodiment is described as an example of a technology according to the present disclosure. However, the technology according to the present disclosure is not limited thereto, and can be applied to an embodiment on which alternation, substitution, addition, omission, and the like are performed.

In the first embodiment, the beacon signals, which are transmitted by beacon terminals BT, are omnidirectional. However, the beacon signals, which are transmitted by beacon terminals BT may have directivity.

As an example, in a case where beacon terminals BT are disposed in positions (for example, wall outlet position and the like) which are close to an adjacent room, beacon terminals BT may cause orientation of radio waves to be transmitted to be headed for the center of the room. Similarly, in a case where beacon terminals BT communicate with wireless connection device 102, beacon terminals BT may have directivity. For example, in a case where beacon terminals BT transmit the reference data to wireless connection device 102, orientation of data transmission may head for the center of the room.

Therefore, it is possible to reduce radio waves from leaking out to the adjacent room. In addition, in a case where another wireless device 103 exists in the vicinity of beacon terminals BT, it is possible to inhibit wireless device 103 from interfering in communication due to radio waves to be transmitted.

In the first embodiment, in a case where the position of position detection terminal 30 is detected using the small cell beacon method, an example, in which the position of beacon terminal BT that transmits the detected radio wave is estimated as the position of position detection terminal 30, is provided. Also, for example, position detection server 50 may estimate that position detection terminal 30 exists in the small cell of beacon terminal BT by maintaining the information of the reception area (small cell) of beacon terminal BT in memory 58. The information of the small cell of the beacon terminal BT includes, for example, information of a maximum transmission distance of the beacon signal transmitted by beacon terminal BT.

In the first embodiment in a case where the position of position detection terminal 30 is detected using the first positional fingerprint method, for example, an example, in which the position of beacon terminal BT that has a high degree of correlation with position detection terminal 30, is estimated as the position of position detection terminal 30, is provided. Also, for example, position detection server 50 may estimate that position detection terminal 30 exists in the reception area of beacon terminal BT by maintaining the information of the reception area of beacon terminal BT in memory 58. Information of the reception area of beacon terminal BT includes, for example, the information of the maximum transmission distance of the beacon signal transmitted by beacon terminal BT.

In the first embodiment, an example in which each device includes two antennas is provided. Also, the number of antennas is not limited thereto, and the number of antennas may be one or three or more. In a case where the number of antennas is one, the antenna switching process is not necessary.

In the first embodiment, the processors may be physically formed in any way. In addition, in a case where a programmable processor is used, it is possible to alternate processing content through alternation of a program, and thus it is possible to increase a degree of freedom for design of the processor. The processor may be formed with one semiconductor chip, or may be physically formed with a plurality of semiconductor chips. In a case where the processor is formed with the plurality of semiconductor chips, each control in the first embodiment may be realized by each separate semiconductor chip. In this case, it is possible to consider that one processor is formed by each of the plurality of semiconductor chips. In addition, the processor may be formed with a member (capacitor or the like) which has a function separate from the semiconductor chip. In addition, one semiconductor chip may be formed to realize the functions, which is included in the processor, and other functions.

INDUSTRIAL APPLICABILITY

The present disclosure is useful for a position detection system, a position detection method, and the like in which it is possible to inhibit an increase in system costs and improve accuracy of detecting a position of a terminal.

REFERENCE MARKS IN THE DRAWINGS

5 PBX SYSTEM
8 IP NETWORK
10 TELEPHONE FUNCTION SHARING CS
11, 21, 31, 41, 51 CONTROLLER
12, 22, 32, 42 WIRELESS CONTROLLER
13, 23 MAIN DEVICE INTERFACE
14 VOICE PROCESSOR
15, 25, 35, 45 ANTENNA SWITCH
15z, 15y, 25z, 25y, 35z, 35y, 45z, 45y ANTENNA
16, 26, 36, 46, 56, 96 PROCESSOR
18, 28, 38, 48, 58, 98 MEMORY
20 POSITION DETECTION CS
30 POSITION DETECTION TERMINAL
33, 43, 53 POSITION DETECTION DATABASE
34, 44, 55 USER INTERFACE
40 TELEPHONE TERMINAL
47 VOICE PROCESSOR
50 POSITION DETECTION SERVER
52 NETWORK INTERFACE
54 ALGORITHM OPERATOR
60 POSITION CHECKING TERMINAL
70 PBX MAIN DEVICE
80 TELEPHONE NW
102, 102A, 102B, 102C WIRELESS CONNECTION DEVICE
103 WIRELESS DEVICE
121 REFERENCE DATA TABLE
125 MEASUREMENT DATA TABLE
180 ROOM
BT BEACON TERMINAL
CL1~CL8 SMALL CELL
MK POSITION MARK
RA1, RA2, RA3 RECEPTION AREA

The invention claimed is:

1. A position detection system comprising:
a first terminal;
a plurality of second terminals;
a wireless connection device; and
a position detection server,
wherein each of the second terminals is disposed in a prescribed position and transmits radio waves in first radio wave intensity,
wherein the wireless connection device is disposed in a prescribed position, and transmits radio waves in second radio wave intensity which is higher than the first radio wave intensity,
wherein the first terminal
measures the radio waves from the wireless connection device or each of the second terminals, and
transmits a measurement result to the position detection server through the wireless connection device, and
wherein the position detection server
maintains first reference data that includes information of a radio wave intensity of the radio waves from the wireless connection device, which is measured by each of the second terminals in a memory,
receives the measurement result from the first terminal,
estimates that the first terminal is located in a position of each of the second terminal which has transmitted the radio waves in a case where the measurement result includes information of the radio waves from each of the second terminals, and
estimates the position of the first terminal based on the information of the radio wave intensity of the radio waves from the wireless connection device, which is included in the measurement result, the first reference data which is maintained in the memory, and a plurality of pieces of positional information of the plurality of second terminals, in a case where the measurement result does not include the information of the radio waves from each of the second terminals.

2. The position detection system of claim 1,
wherein, in the case where the measurement result does not include the information of the radio waves from each of the second terminals, the position detection server derives correlation information between the position of each of the second terminals and the position of the first terminal with respect to each of the second terminals, and estimates that the first terminal is located in the position of the second terminal, which has a highest degree of correlation, based on the correlation information.

3. The position detection system of claim 1,
wherein, in the case where the measurement result does not include the information of the radio waves from each of the second terminals, the position detection server derives correlation information between the position of each of the second terminals and the position of the first terminal with respect to each of the second terminals, and estimates the position of the first terminal, based on a plurality of pieces of correlation information and the plurality of pieces of positional information of the plurality of second terminals.

4. The position detection system of claim 1,
wherein the position detection server
maintains the first reference data and second reference data in the memory, the second reference data including the information of the radio wave intensity of the radio waves, which is measured by the wireless connection device, from each wireless connection device, and
estimates the position of the first terminal based on the information of the radio wave intensity of the radio waves from the wireless connection device, which is included in the measurement result, the first reference data which is maintained in the memory, the second reference data which is maintained in the memory, the positional information of each of the second terminals, and the positional information of the wireless connection device, in the case where the measurement result does not include the information of the radio wave intensity of the radio waves from each of the second terminals.

5. The position detection system of claim 1,
wherein each of the second terminals transmits the radio waves which have directivity in a prescribed direction.

6. The position detection system of claim 1, further comprising:
a private branch exchanger,
wherein the first terminal transmits the measurement result to the position detection server through the wireless connection device and the private branch exchanger.

7. A position detection method for estimating a position of a first terminal, the method comprising:
by a second terminal that is disposed in a prescribed position,
transmitting radio waves in first radio wave intensity,
by a wireless connection device that is disposed in a prescribed position,
transmitting radio waves in second radio wave intensity which is higher than the first radio wave intensity,
by the first terminal,
measuring the radio waves from the wireless connection device or the second terminal, and
transmitting a measurement result to a position detection server through the wireless connection device, and
by the position detection server,
receiving the measurement result from the first terminal,
estimating that the first terminal is located in the position of the second terminal which has transmitted the radio waves in a case where the measurement result includes information of the radio waves from the second terminal, and
estimating the position of the first terminal based on information of a radio wave intensity of the radio waves from the wireless connection device, which is included in the measurement result, the information of the radio wave intensity of the radio waves from the wireless connection device, which is maintained in the memory and is measured by the second terminal, and position information of the second terminal, in a case where the measurement result does not include the information of the radio wave intensity of the radio waves from the second terminal.

* * * * *